(12) United States Patent
Kinkel et al.

(10) Patent No.: US 6,202,429 B1
(45) Date of Patent: Mar. 20, 2001

(54) HEATING AND COOLING UNIT

(75) Inventors: Stephen W. Kinkel; Steven J. Goettl; Peter J. Kinkel, all of Phoenix, AZ (US)

(73) Assignee: Phoenix Manufacturing Inc., Phoenix, AZ (US)

( * ) Notice: Subject to any disclaimer, the term of this patent is extended or adjusted under 35 U.S.C. 154(b) by 0 days.

(21) Appl. No.: 09/028,752

(22) Filed: Feb. 24, 1998

Related U.S. Application Data

(63) Continuation-in-part of application No. 08/959,685, filed on Oct. 29, 1997, which is a continuation of application No. 08/610,869, filed on Mar. 5, 1996, now abandoned.

(51) Int. Cl.[7] ............................................ F28D 3/00
(52) U.S. Cl. .................. 62/171; 62/171; 62/176.4; 62/310; 165/225
(58) Field of Search ........................... 62/176.4, 176.6, 62/171, 310, 332, 121; 165/224, 225, 227

(56) References Cited

U.S. PATENT DOCUMENTS

| | | | |
|---|---|---|---|
| 1,909,164 | 5/1933 | Bulkeley | 165/60 X |
| 1,933,330 | 10/1933 | Johnson | 165/60 X |
| 2,628,480 | * 2/1953 | Feinberg | 62/4 |
| 3,153,332 | * 10/1964 | Goettl et al. | 62/305 |
| 3,182,718 | 5/1965 | Goettl | 165/60 |
| 3,747,362 | * 7/1973 | Mercer | 62/171 |
| 3,859,818 | * 1/1975 | Goettl | 62/311 |
| 3,913,345 | * 10/1975 | Goettl | 62/183 |
| 4,178,764 | * 12/1979 | Rowe | 62/81 |
| 4,232,531 | 11/1980 | Mangam, Jr. et al. | 62/171 |
| 4,289,713 | * 9/1981 | Goettl | 261/27 |
| 4,333,887 | * 6/1982 | Goettl | 261/27 |
| 4,493,195 | 1/1985 | Zalesak et al. | 62/402 |
| 4,505,327 | 3/1985 | Angle et al. | 165/48 R |
| 4,510,766 | * 4/1985 | Curtis, Sr. | 62/171 |
| 4,803,849 | * 2/1989 | Diaz | 62/311 |
| 5,106,543 | 4/1992 | Dodds | 261/36.1 |
| 5,282,726 | 2/1994 | Warren | 417/243 |
| 5,309,726 | 5/1994 | Ashbridge | 62/91 |
| 5,377,500 | 1/1995 | Yang | 62/238.6 |
| 5,390,505 | 2/1995 | Smith et al. | 62/173 |
| 5,435,382 | 7/1995 | Carter | 165/110 |
| 5,778,696 | * 7/1998 | Conner | 62/238.6 |

* cited by examiner

*Primary Examiner*—William Doerrler
*Assistant Examiner*—Marc Norman
(74) *Attorney, Agent, or Firm*—Jordan M. Meschkow, Esq.; Lowell W. Gresham, Esq.; Meschkow & Gresham, P.L.C.

(57) ABSTRACT

An apparatus for maintaining an enclosed space proximate a selected comfort level, and for conserving utilities, the apparatus comprising a housing in communicating relation with the enclosed space and the external environment and having an evaporative cooler for cooling the enclosed space and having a predetermined operating efficiency, and a spaced apart air conditioner for either selectively cooling or heating the enclosed space, having a baffle that restricts airflow to the air conditioner and an operating efficiency different from the evaporative cooler, and a control mechanism for automatically and selectively switching back and forth from operation of the evaporative cooler to the air conditioner in response to ambient conditions of the external environment and the operating efficiencies of the evaporative cooler and the air conditioner.

20 Claims, 23 Drawing Sheets

AIRFLOW FROM EVAPORATOR
(DAMPER IN CLOSED POSITION OR SECOND CONFIGURATION)

AIRFLOW FROM COOLING PAD
(DAMPER IN OPEN POSITION OR FIRST CONFIGURATION)

HEATING AND COOLING UNIT

RELATED PATENTS

This application is a continuation-in-part of Ser. No. 08/959,685, filed on Oct. 29, 1997, entitled "Heating And Cooling Unit", by Stephen W. Kinkel, Steven J. Goettl, and Peter J. Kinkel which is a continuation of Ser. No. 08/610,869, filled on Mar. 5, 1996, entitled "Heating And Cooling Unit", by Stephen W. Kinkel, Steven J. Goettl, and Peter J. Kinkel, now abandoned.

TECHNICAL FIELD OF THE INVENTION

This invention relates to heating and cooling apparatus.

More particularly, this invention relates to heating and cooling apparatus for use in combination with structures.

In a further and more specific aspect, the present invention relates to a heating and cooling unit for maintaining an environment enclosed by a structure at a selectively desired comfort level.

BACKGROUND OF THE INVENTION

Air-conditioning is normally defined as the control of temperature, humidity, purity, and motion of air in an enclosed space, independent of outside conditions. There exist a variety of apparatus and methods to control the environmental conditions of an enclosed space, stemming from the primitive means of hanging wet grass mats over windows for cooling air by evaporation, to more advanced techniques that employ more sophisticated air-conditioning technology.

For instance, a simple air conditioner, a refrigerant, normally consisting of freon (carbon compounds containing fluorine and chlorine or bromine), in a volatile liquid form, is passed through a set of evaporator coils across which air from inside a room or enclosed space is passed. The refrigerant evaporates and, in the process, absorbs the heat contained in the air. When the cooled air reaches its saturation point, its moisture content condenses on fins placed over the coils. The water runs down the fins and drains. The cooled and dehumidified air is returned into the room by means of a blower. During this process, the vaporized refrigerant passes into a compressor where it is pressurized and forced through condenser coils, which are in contact with the outside air. Under these conditions, the refrigerant condenses back into a liquid form and gives off the heat it absorbed from the air inside the enclosed space. This heated air is expelled to the outside, and the liquid re-circulates to the evaporator coils to continue the cooling process. In some units, the two sets of coils can reverse functions so that in winter, the inside coils condense the refrigerant and heat rather than cool the room or enclosed space. Such a unit is typically referred to as a heat pump, which can selectively cool or heat the enclosed space.

Although air-conditioning units as described above are exemplary, they are expensive to operate as they use a tremendous amount of electrical power, and the refrigerant must be periodically replaced or replenished. Furthermore, the chemicals used in air conditioners contain chlorofluorocarbons, which are proven harmful to humans and the environment. Additionally, air-conditioning units typically re-circulate the air in an enclosed structure, and the re-circulated air eventually becomes stale and impure over time.

Another system of cooling air in an enclosed space is simply by means of passing air through water for cooling the air by means of evaporation. The apparatus used for accomplishing this method of cooling are normally referred to as evaporative coolers. Although evaporative coolers are less expensive to operate than the air conditioners that use refrigerant as discussed above, and they do not re-circulate the air as do the air conditioners, they are not very effective when the 1% coincident wet bulb temperatures are high. Thus, although evaporative coolers are less costly to operate, air-conditioning units are more effective at higher 1% coincident wet bulb temperatures. Furthermore, over time, evaporative coolers tend to use lots of water, and provide a buildup of humidity within the structure which can lead to mildew build-up, and an annoying mildew smell. In order to attain relief, windows in the structure must be opened to release the humid air, or relief vents can be provided for expelling the humid air.

Accordingly, many structures have both an air-conditioning apparatus, and an evaporative cooling apparatus, both of which are used for cooling the internal areas of the structure. However, in order to have both an air-conditioning unit and an evaporative cooler, both must be separately purchased, which is not only very expensive, but also inconvenient and time consuming to install. Additionally, when both an air-conditioning unit and an evaporative cooler unit are installed in combination with a structure, two penetrations into the structure are required which lead into two different sets of duct systems which also must be constructed at considerable cost. A further inconvenience of having both an air-conditioning unit and an evaporative cooler unit is that in order to switch use from one or the other as selectively desired, it must be done manually by either physically adjusting the individual units, or by means of a manual switch located apart from the individual units and normally within the structure.

Some cooling units include both an air-conditioning unit and an evaporative cooler unit that contains a damper and actuator mechanism that moves the damper back and forth from operation of the air-conditioning unit and the evaporative cooler unit, and through the manual operation of a remote control position switch. However, not only is it inconvenient to have to manually operate the remote control position switch, it is not always readily apparent to the user when it is more cost effective and efficient to switch from either the air conditioner unit or the evaporative cooler to the other.

Alternate systems of cooling include the use of chilled water. Water may be cooled by refrigerant at a central location and run through coils at other places. Water may be sprayed over glass fibers and have air blown through it. Dehumidification is achieved in some systems by passing the air through silica gel which absorbs the moisture, and in others, liquid absorbents cause dehydration. Although these systems are exemplary, they use a tremendous amount of water, which can not only be expensive, but not very practical for dryer regions where water is less abundant.

The specific design of air-conditioning systems normally requires the consideration of a variety of variables and circumstances. For instance, some of the self-contained units, described above, serve an enclosed space directly. More complex systems, as in tall or large buildings, use ducts to deliver the cooled air. In the induction system, air is cooled once at a central plant, and then conveyed to individual units, where water is used to adjust the air temperature according to such variables as sunlight exposure and shade. In the dual-duct system, warm air and cool air travel through separate ducts and are mixed to reach a desired temperature. A more simple means of controlling temperature is to regulate the amount of cold air supplied, cutting it off once a desired temperature is reached. Since these types of systems require two distinct sets of ducts, one for carrying cool air and one for carrying warm air, they are normally very expensive to manufacture as a result of the requirement of having two sets of ducts, and very expensive to maintain.

It would be highly advantageous, therefore, to remedy the foregoing and other deficiencies inherent in the prior art.

Accordingly, it is an object of the present invention to provide a new and improved apparatus for heating and cooling.

Another object of the present invention is to conserve utilities.

Another object of the present invention is to provide an apparatus for heating and cooling that is relatively inexpensive to manufacture.

Still another object of the present invention is to provide an apparatus for heating and cooling having an automatic switching mechanism for selectively and automatically switching operation of the unit between air-conditioning and evaporative cooling when the environmental conditions provide use of one is more efficient and cost effective than the other.

Yet another object of the present invention is to eliminate the need for multiple penetrations through a structure, and the need for multiple duct systems.

Yet still another object of the present invention is to eliminate the need for a user to purchase separate air-conditioning and evaporative cooler units.

And a further object of the invention is to eliminate the need for opening windows for relieving a structure of humid or stale air.

Still a further object of the immediate invention is to provide a heating and cooling unit that uses a common duct system.

Yet a further object of the invention is to reduce energy costs associated with heating and cooling.

And still a further object of the invention is to provide a heating and cooling unit that is easily installed, and easily accessible for servicing and repair.

In addition to the objects mentioned above, the present invention considers heating and cooling systems that use their respective components to additionally provide a ventilating or air circulating system for the structure. Conventional heating, cooling and ventilating systems use the ducting and the blower of the heating and cooling system to provide air circulation for the structure. Typical ventilating systems use the blower to pump air through supply ducting and into the structure, and use return air ducting to receive air from the structure. A conventional ventilating system such as this, provides for circulation or movement of air within the structure.

Conventional ventilating systems circulate air within the structure and require the opening of doors, windows and the like to introduce fresh air into the structure. The opening of doors and/or windows to introduce fresh air is frequently undesirable as it allows outside noise and unfiltered air to enter the structure and provides reduced security for occupants inside the structure. Moreover, when no doors, windows and/or relief vents are open, an undesirable build up of ambient pressure inside the structure can occur. A like ambient pressure build up occurs when conventional evaporative cooling systems are run without opening any doors, windows and/or relief vents. This undesirable build up of ambient pressure can become significant enough to cause discomfort to the occupants inside the structure and may even cause damage to the structure itself.

As previously discussed, evaporative coolers are not very effective when the wet bulb temperature or relative humidity is relatively high. Evaporative coolers are also less effective when the ambient dry bulb temperature is relatively high. An example of this is when the selected or desired temperature inside the structure cannot be satisfied since the evaporative cooling process cannot lower the relatively high temperature of the ambient air to the desired temperature no matter how dry the ambient air is. This can occur even when the relative humidity is low and relative hot dry ambient air is available for evaporative cooling. In this case the evaporative cooler is unable to provide the desired amount of cooling for the structure and air-conditioning is desirable.

Some cooling units that have both an air-conditioning unit and an evaporative cooling unit need to select which unit to operate. One conventional means for selecting between air-conditioning and evaporative cooling uses an internal duct temperature and a predetermined effectiveness of the evaporative cooler to calculate an external ambient temperature and humidity. This calculation can lead to inaccurate results and is not as accurate as taking a direct measurement of the external ambient temperature and humidity. A switching point that is characterized by a predetermined internal duct-ambient temperature and humidity is compared to the calculated (not actual) external ambient conditions and the appropriate cooling device is selected in response to this comparison. For this conventional means, the temperature sensor is located inside ducting that is downstream of the evaporative cooler. This exposes the temperature sensor to relative high velocity air that is substantially unfiltered. Small amounts of dirt and debris can easily damage the temperature sensor and/or cause the temperature sensor to give inaccurate readings. Inaccurate calculation of ambient conditions can result in improper selection of the appropriate cooling device. However, directly measuring external ambient atmospheric conditions is difficult because external effects, such as direct sunlight and exhaust airflow from the unit can easily influence sensor readings Conventional evaporative cooling systems have a water circulating pump located in a cooling water reservoir that holds an amount of cooling water. The pump moves the cooling water from the reservoir through a cooling water line that is capped at one end. The water line has a quantity of orifices or openings that are located above a cooling pad and upstream of the capped end. The cooling pad is located in a cooling unit inlet airflow path. The cooling pad retains a portion of cooling water that is pumped through and emitted by the water line openings. Unit inlet airflow passing through the cooler pad is evaporatively cooled. Typically, evaporative cooling systems cap off the water cooling line at a location that is downstream of and close to the last opening in the water line. After a time these openings become clogged with mineral deposits from the cooling water. One conventional technique for reducing these mineral deposits bleeds off a portion of cooling water before it reaches the openings This reduces the amount of reservoir cooling water such that an automatic fill valve opens and new water is supplied to the reservoir. This technique tends to reduce mineral build up in the cooling water reservoir but does little to clear openings that become clogged over time.

As discussed earlier, the present invention considers cooling units that have both an air-conditioning unit and an evaporative cooling unit. Such cooling units typically have a damper and actuator mechanism for moving the damper back and forth between operation of the air-conditioning unit and the evaporative cooling unit. One such conventional cooling unit uses pneumatic pressure generated by the blower to actuate the damper. Such units are susceptible to damper movement from wind gusts, resulting in reverse airflow through the damper and loss of cooling flow. When such a unit is operating the air-conditioning unit, the blower operates at low speed and generates low pressures that can provide inadequate damper sealing on windy days. No matter whether the air-conditioning unit or the evaporative cooling unit is operating, positive damper sealing in such units is highly desirable. Hot outside air leaking through the damper seals into the unit or inside cooled air leaking through the damper seals to the outside environment, drastically reduces the cooling efficiency of whichever cooling unit is operating.

In addition, such cooling units typically use a common set of duct work and a common blower for both the air-conditioning unit and the evaporative cooling unit. This creates a problem in that evaporative cooling units operate at a relatively high airflow, desiring relatively large ducts with the blower operating at relatively high speeds, while air-conditioning units operate at relatively low airflow, desiring relatively small ducts with the blower operating at relatively low speeds. Those skilled in the art of designing heating and air-conditioning systems will recognize this to be an airflow mismatch or airflow matching problem. One solution to the problem would be to use small ductwork and a low speed blower for the air-conditioning unit and large duct work and a high speed blower for the evaporative cooling unit. This solution is not only expensive but also negates the reasoning for having a single cooling unit. Conventionally, this problem is solved by using duct work that is sized mid-way between what the air-conditioning unit desires and what the evaporative cooling unit desires along with a selectable dual speed blower having a high speed and a low speed. This typical solution compromises the efficiencies of both the air-conditioning unit and the evaporative cooling unit. Another solution uses duct work sized for the evaporative cooling unit and a dual speed blower with a baffle attached at the blower inlet, to reduce airflow when operating the air-conditioning unit. However, since the baffle is attached to the blower, unless the baffle is removed, the baffle undesirably restricts airflow when the evaporative cooling unit is operating and compromises the efficiency of the evaporative cooling unit.

Accordingly a need exists for a heating, cooling and ventilating system housed in a single enclosure, that combines an air-conditioning or heat pumping apparatus with an evaporative cooling apparatus to provide and maintain a selected comfort level for an enclosed space by controlling that system to select the most effective system cooling apparatus in accordance with the ambient conditions and trends thereof. Moreover, such a heating, cooling and ventilating system would have a means for regulating airflow such that a common blower and a common duct work system could be used by the air-conditioning unit and the evaporative cooling unit without significant reduction in operating efficiency of either unit.

SUMMARY OF THE INVENTION

Briefly, to achieve the desired objects of the present invention in accordance with a preferred embodiment thereof, provided is an apparatus for maintaining an enclosed space proximate a selected comfort level, and for conserving utilities. The apparatus is comprised of a heating and cooling unit having a housing in communicating relation with the enclosed space and the external environment and having an evaporative cooler for cooling the enclosed space and having a predetermined operating efficiency. Also included, and in spaced-apart relation to the evaporative cooler, is an air conditioner for either selectively cooling or heating the enclosed space and having an operating efficiency different from the evaporative cooler. Further included is a control mechanism for automatically and selectively switching back and forth from operation of the evaporative cooler to the air conditioner.

Also provided is a method for selectively maintaining a space enclosed by a structure proximate a selectively desired comfort level, and for conserving utilities. The method includes the steps of efficiently conditioning air to provide efficiently conditioned air to the space, and introducing the efficiently conditioned air into the space.

The method further includes the steps of conditioning the air through a first apparatus having a predetermined operating efficiency, or conditioning the air through a second apparatus having a predetermined operating efficiency different from the operating efficiency of said first apparatus, and automatically controlling the selective operation of the first apparatus and the second apparatus for exploiting either the first apparatus or the second apparatus for maintaining the space proximate the predetermined comfort level and for conserving utilities.

BRIEF DESCRIPTION OF THE DRAWINGS

The foregoing and further and more specific objects and advantages of the present invention will become readily apparent to those skilled in the art from the following detailed description of preferred embodiments thereof taken in conjunction with the drawings in which.

DETAILED DESCRIPTION OF THE PREFERRED EMBODIMENTS

Figure 1:
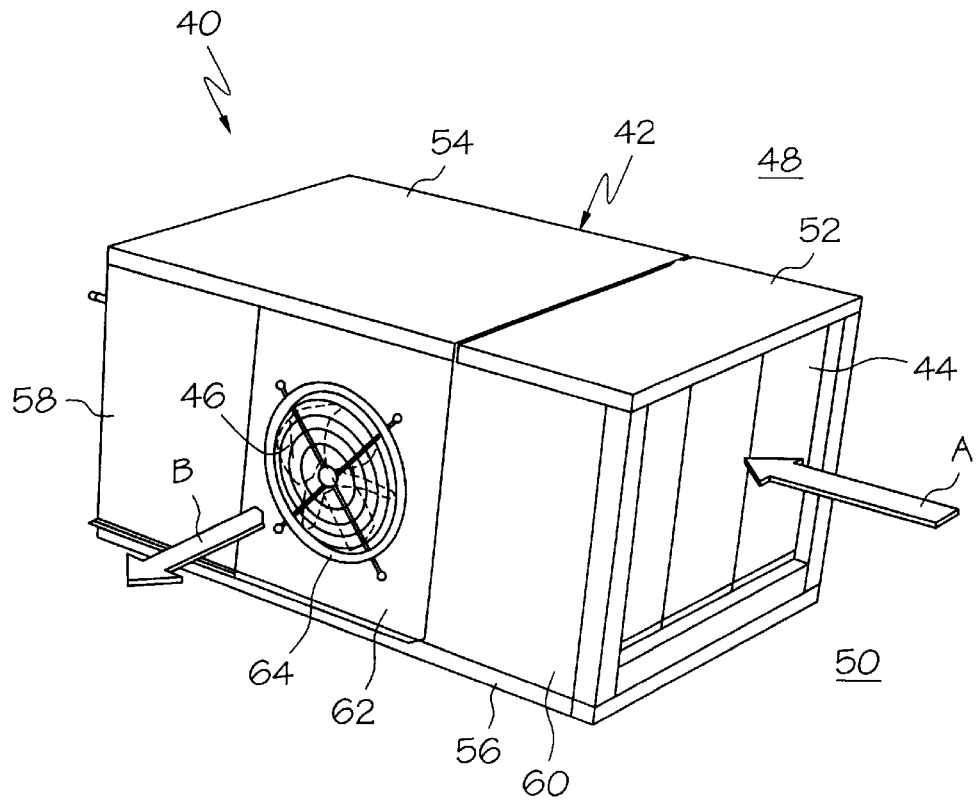
FIG. 1 is a front perspective view of an embodiment of the present invention constructed in accordance with the preferred embodiment, the invention comprising a heating and cooling unit.

Turning now to the drawings, in which like reference characters indicate corresponding elements throughout the several views, attention is first directed to FIG. 1 which illustrates a first embodiment of the present invention comprising a heating and cooling unit 40. The unit 40 is operative for controlling the environmental conditions, i.e., temperature and humidity, of an environment defined by an enclosed space, such as a room or the entire internal enclosed space of a structure such as a home, office building, warehouse, or the like. In a more specific aspect, as will be herein specifically described as the detailed description ensues, unit 40 includes a cooling means for selectively lowering the temperature or cooling the space defined within an enclosed structure, and a conditioning means for either cooling or heating the enclosed space as selectively desired. The cooling capabilities, efficiencies, and costs of operation of the cooling means and the conditioning means differ with respect to different external environmental conditions, details of which will be herein further specifically described.

Figure 2:
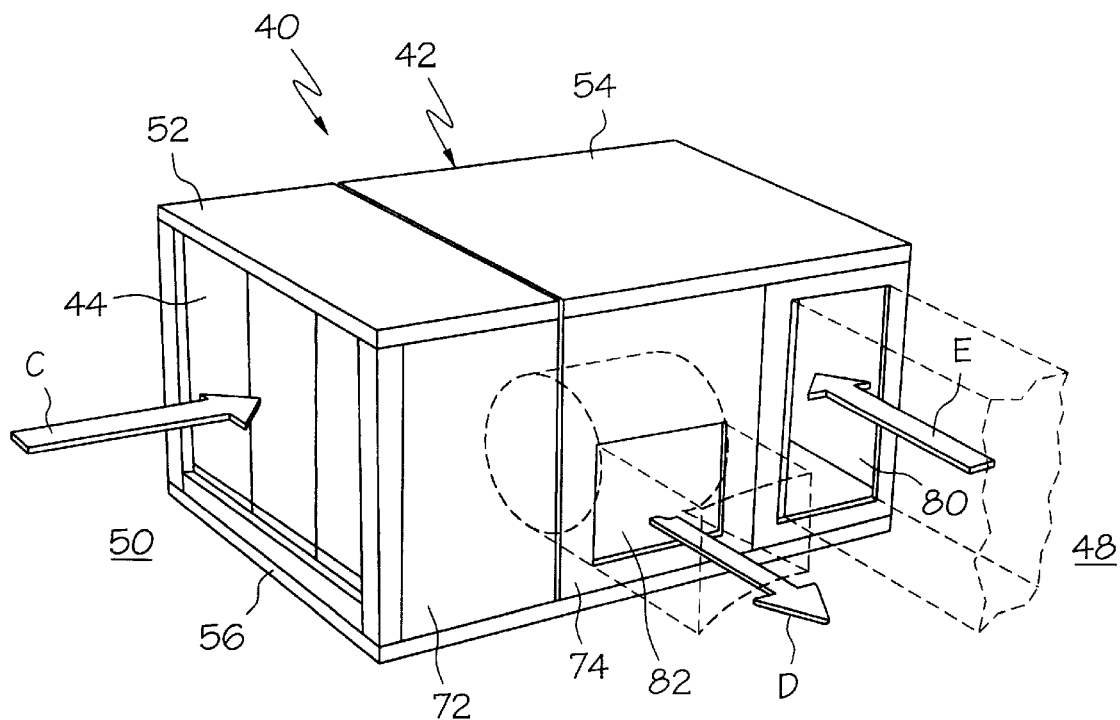
FIG. 2 is a rear perspective view of the embodiment depicted in combination with FIG. 1.
Figure 3:
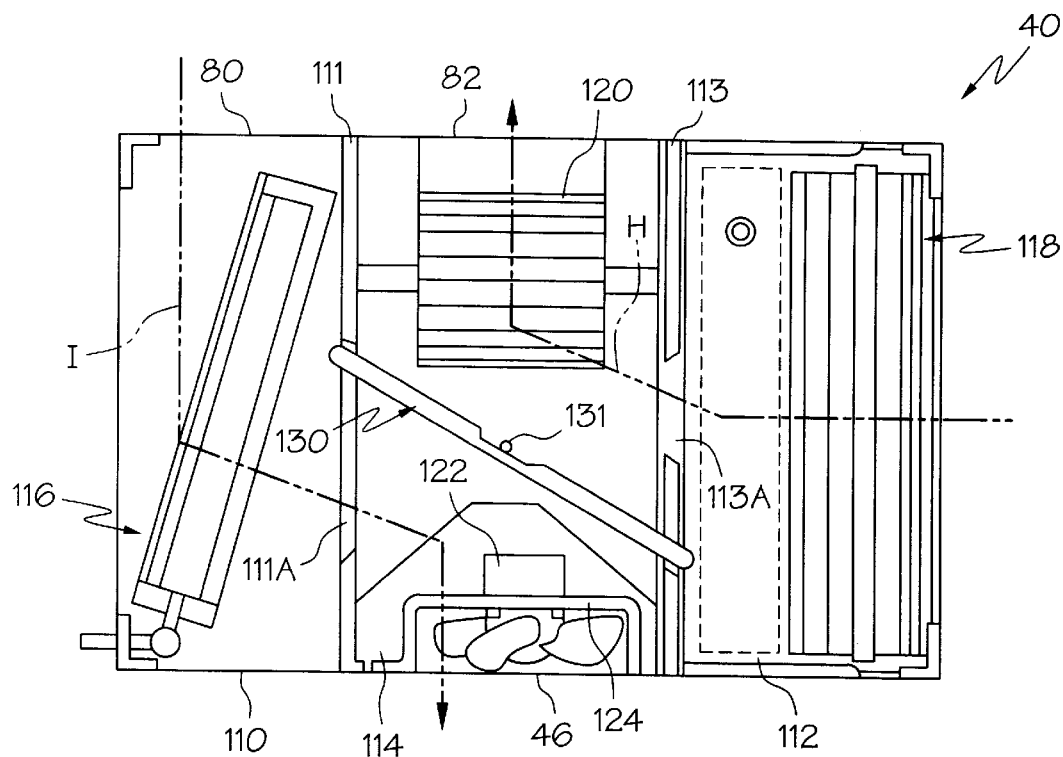
FIG. 3 is a top plan view of the present invention of FIG. 1 with portions therein being removed for the purpose of illustration.
Figure 4:
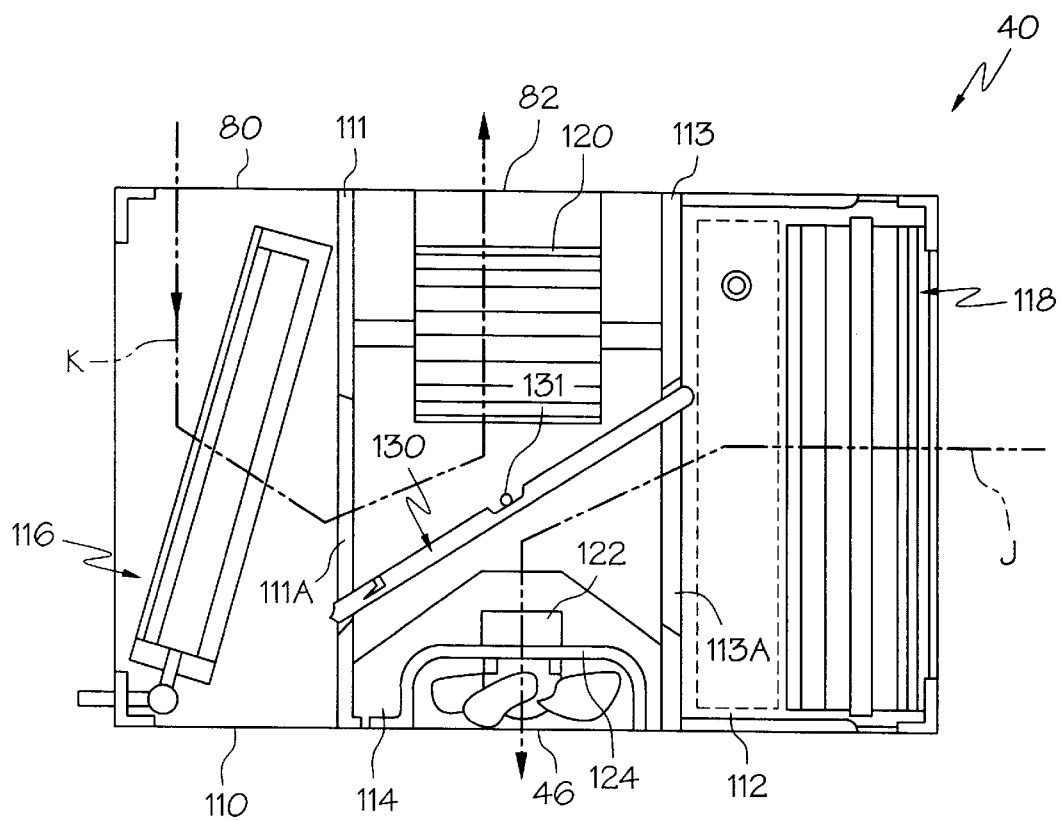
FIG. 4 is a view very similar to the view of FIG. 3.

Consistent with the foregoing, attention is directed again to FIG. 1, and further to FIG. 2, FIG. 3, and FIG. 4, all of which illustrate the first embodiment of the present invention. As can be seen in FIG. 1 and FIG. 2, unit 40 includes a housing 42 which functions as an enclosure for enclosing and housing the internal working parts of the unit 40 of which will be discussed shortly. Preferably constructed of stainless steel, aluminum, or other preferred material capable of withstanding adverse environmental conditions, housing 42 has a generally rectangular configuration. Unit 40 may be mounted in an attic, on a roof, or on the ground next to a structure as selectively desired.

As can be seen in FIG. 1 and FIG. 2, arrow A and arrow C indicate the passage of air into unit 40 through side end panel 44 which defines a main inlet, and arrow B indicates the passage of exhaust air through exhaust port 46 which defines a main outlet. End panel 44 is basically a filter through which air that passes is filtered by trapping particulate matter and other undesired foreign substances. As it will be herein discussed, when air passes into unit 40, it is either heated or cooled, directed into an enclosed space 48 defined by a structure (not herein specifically shown), and then either circulated by unit 40, or expelled by unit 40 in the form of exhaust. Preferably mounted on the roof of a structure to be heated and cooled, the air that passes into unit 40 normally comes from the outside external environment 50, and the air that unit 40 expels from exhaust port 46 is similarly expelled into the outside environment 50.

Figure 5:
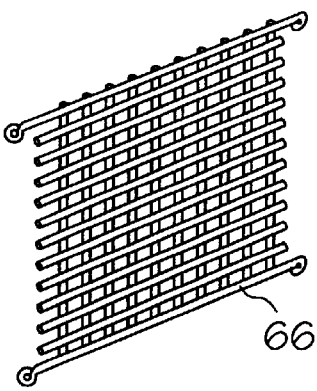
FIG. 5 is a perspective view of an embodiment of a grating used in combination with an exhaust port.

The housing 42 of unit 40 is preferably comprised of a removable first top panel 52, a removable second larger top panel 54, and a base panel 56. The first top panel 52 and the second larger top panel are preferably removable for allowing easy access to the enclosed working parts for facilitating easy repair or replacement of worn or broken parts. Also included is a first removable outer side panel 58, a second removable outer side panel 60, and a removable intermediate outer side panel 62 having the exhaust port 46 extending therethrough, the exhaust port 46 being enclosed by a generally circular protective grating 64 which is coupled to portions of intermediate side panel 62. With momentary reference to FIG. 5, shown is an alternate embodiment of a protective grating that may be used in lieu of protective grating 64. As can be seen, FIG. 5 illustrates a generally rectangular protective grating 66.

Referring again to FIG. 2, housing 42 further includes a first inner side panel 70, a second inner side panel 72, and an intermediate inner side panel 74, all of which normally abut a structure. First inner side panel 70 includes a generally rectangular air inlet port 80, and the intermediate inner side panel includes a smaller and more square air outlet port 82. Air inlet port 80 and air outlet port 82 are preferably coupled to passages or ducts which lead into the enclosed space defined by a structure, and which facilitate air communicating relation between unit 40 and the enclosed space.

Air that has been either cooled or heated by unit 40 passes through air outlet port 82 in the direction as indicated by arrow D for introduction into the structure for either heating or cooling the enclosed space. Additionally, air inlet port 80 operates for receiving air from the enclosed space of a structure in the direction as indicated by arrow E for allowing unit 40 to either re-circulate the air back into the structure, or expel the air through the exhaust port 46, details of which will be herein discussed.

Figure 6:
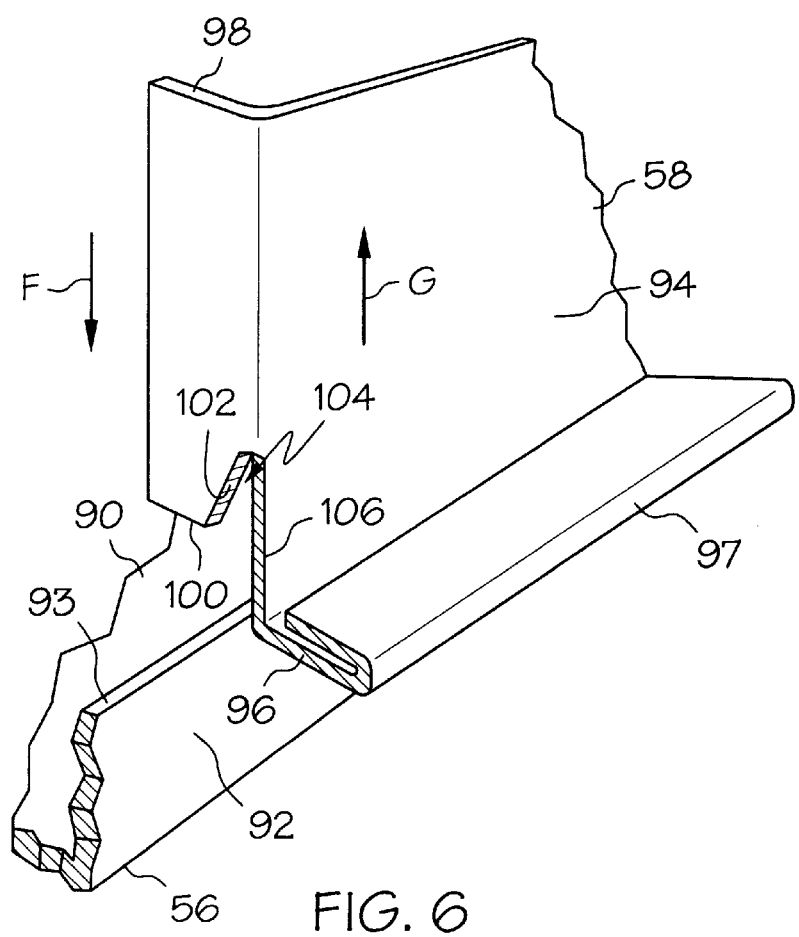
FIG. 6 is an enlarged fragmentary perspective view of portions of a housing.

Referring momentarily to FIG. 6, illustrated are portions of first side panel 58 and base panel 56. From FIG. 6, it can be seen that base panel 56 includes a generally planar bottom panel 90 having a generally peripheral upstanding side wall 92 which terminates with an upper edge 93. First side panel 58, includes a substantially planar side wall 94 having a lower outwardly and laterally extending flange 96 residing in a substantial horizontal plane and terminating with a generally rounded out end 97, and an inwardly extending longitudinal flange 98 having a lower end 100 residing in a higher generally horizontal plane. Longitudinal flange 98 includes a lower generally inwardly extending edge 102 terminating with lower end 100 which defines a generally inverted V-shaped gap 104 being further defined by a terminal outer edge portion 106 of first side panel 58.

First side panel 58 may be either easily coupled to or easily removed from base panel 56. For coupling first side panel 58 to the base panel 56, first side panel may be disposed in the direction indicated by arrowhead line F in FIG. 6 so that upstanding side wall 92 becomes frictionally engaged or pinchedly retained within gap 104. Similarly, first side panel 58 may be easily detached or disengaged from upstanding side wall 92 of base panel 56 when selectively disposed in the direction indicated by arrowhead line G. The flange 96 may be easily and conveniently gripped or held for either engaging or disengaging the first side panel 58 from the base panel. Although not herein specifically shown, it will be readily understood that the other side panel sections of housing 42 may include similarly constructed elements for allowing easy removal of the side panels for access into the internal portions of unit 40 enclosed by housing 42, and for easy engagement of the respective side panels with the base panel 56.

Referring now to FIG. 3 and FIG. 4, illustrated are the internal mechanisms of unit 40. With respect to the preferred embodiment, housing 42 of unit 40 essentially defines three distinct internal sections, section 110, section 112, and section 114 located intermediate section 110 and section 112, all of which are in air communicating relation. Section 110, being separated from section 114 by means of a partition 111 having an opening 111A formed therethrough, houses a preferred conditioning means comprising an air-conditioning apparatus 116 of the conventional type, such as one provided from Fraser-Johnson® model number EDHP-FO60S stock number 4E347, which uses a refrigerant such as Freon for selectively heating air passed therethrough, or for cooling air passed therethrough. Since air-conditioning apparatus 116 is of the conventional type, further details specific therewith will not be herein specifically described as they will be readily understood by those having ordinary skill in the relevant art. Section 112, being separated from section 114 by means of a partition 113 having an opening 113A formed therethrough, houses a preferred cooling means comprising an evaporative cooling apparatus 118, such as one provided from Fraser-Johnson® model number MCHD060S stock number 3F456, of the conventional type which uses water for cooling air that passes through it. Since the evaporative cooling apparatus 118 is of the conventional type, further details specific therewith will not be herein specifically described as they will be readily understood by those having ordinary skill in the relevant art.

Section 114 houses a blower 120 for sucking air from outside unit 40 and for blowing the air into the enclosed space of a structure through the outlet port 82. The blower 120 is suitably located proximate air outlet port 82, and is further of a conventional sort normally used in combination with apparatus of the type herein specifically disclosed. Accordingly, further details of blower 120 will not be herein specifically discussed as they will be readily apparent and understood by those having ordinary skill in the relevant art.

Further housed proximate section 114 is seen a fan 122 coupled by means of a bracket element 124 proximate exhaust port 46 and operative for expelling or blowing exhaust air out of exhaust port 46. Further provided, and properly positioned proximate section 114 is seen a damper 130 mounted to portions of the housing 42 proximate section 114 by means of a pivotal mount 131 located at a generally intermediate position proximate damper 130, the damper 130 being mounted for reciprocal horizontal pivotal movement. Damper 130, further details of which will be herein discussed as the detailed description ensues, is operative for directing air provided from section 110 and section 112.

With specific reference to FIG. 3, damper is shown disposed in a first configuration. In this configuration, when blower 120 is operating and thereby sucking air in from outside unit 40, and blowing the air into the enclosed space of a structure, the air passes in the direction indicated by jagged arrow H through end panel 44, into section 112 and through evaporative cooling apparatus 118. The air then continues flow and passes through opening 113A into section 114 and against portions of damper 130, into the blower 120, and out from the blower 120 through air outlet port 82 and into the enclosed space of a structure. As has been herein intimated, air passing through the evaporative cooling apparatus 118 operative for providing cool air to the enclosed space of structure for cooling the enclosed space. Furthermore, when unit 40 is actuated, both the blower 120 and fan 122 are preferably actuated and operational. As such, as the air is introduced into the enclosed space of a structure, positive pressure builds up in the enclosed space in addition to humid air. As such, the fan 122 operates for blowing air provided from the enclosed space out of exhaust port 46 which indicates that fresh air provided from outside the unit 40 is constantly being supplied into the structure and then selectively expelled as exhaust from exhaust port 46 for relieving the positive pressure and for inhibiting the buildup of humid air or humidity within the enclosed space.

In particular, and with continuing reference to FIG. 3, once the air has been introduced into the enclosed space of the structure, the air is then drawn out of the enclosed space, either directly or indirectly through ducts, by fan 122 and from the positive pressure buildup. As a result the air passes in the direction indicated by jagged arrow I into section 110 through air inlet port 80. The air then passes through the air-conditioning apparatus 116 which is turned off when the evaporative cooling apparatus 118 is running, and through opening 111A into section 114. The air then is passed against portions of damper 130, through fan 122 and out exhaust port 46. From this discussion, it will be appreciated, that as air is passed into the enclosed space of a structure, positive pressure builds up in the enclosed space. As a result, the exhaust port 46 functions as a relief for relieving the positive pressure, and for inhibiting the buildup of moist air provided from the evaporative cooling apparatus 118.

Referring to FIG. 4, the damper 130 is shown disposed in a second configuration in the second configuration, the evaporative cooling apparatus 118 is not operational, and the air-conditioning apparatus 116 operational for either heating the enclosed space, or cooling the enclosed space as selectively desired. As indicated by the jagged arrow J, air from outside unit 40 can be seen as passing through end panel 44 and into section 112. From section 112, the air then passes through opening 113A and into section 114, the air then being directed against portions of damper 130 and then out the exhaust port 46. Further provided in this second configuration, the air-conditioning apparatus 116 is operational with blower 120 blowing and re-circulating the air within the enclosed space of the structure. In further detail, air from the enclosed space of the structure passes in the direction indicated by jagged arrow K through air inlet port 80 and into section 110. From section 110, the air then passes through the air-conditioning apparatus 116 and is either heated or cooled. From the air-conditioning apparatus 116, the conditioned air then passes through opening 111A into section 114, against portions of damper 130, through blower 120 and is then projected from the blower 120 through air outlet port 82 and into the enclosed space either directly or indirectly by means of a duct.

The damper 130 is selectively movable between the first configuration and the second configuration by means of a control means, to be herein discussed, which operates to switch the damper back and forth from the first configuration to the second configuration as needed to maintain the enclosed space relative a selectively desired comfort level, and for also operating the unit at optimal level for conserving the utilities necessary for operating the unit such as electricity, water, and perhaps natural gas if applicable.

Figure 7:
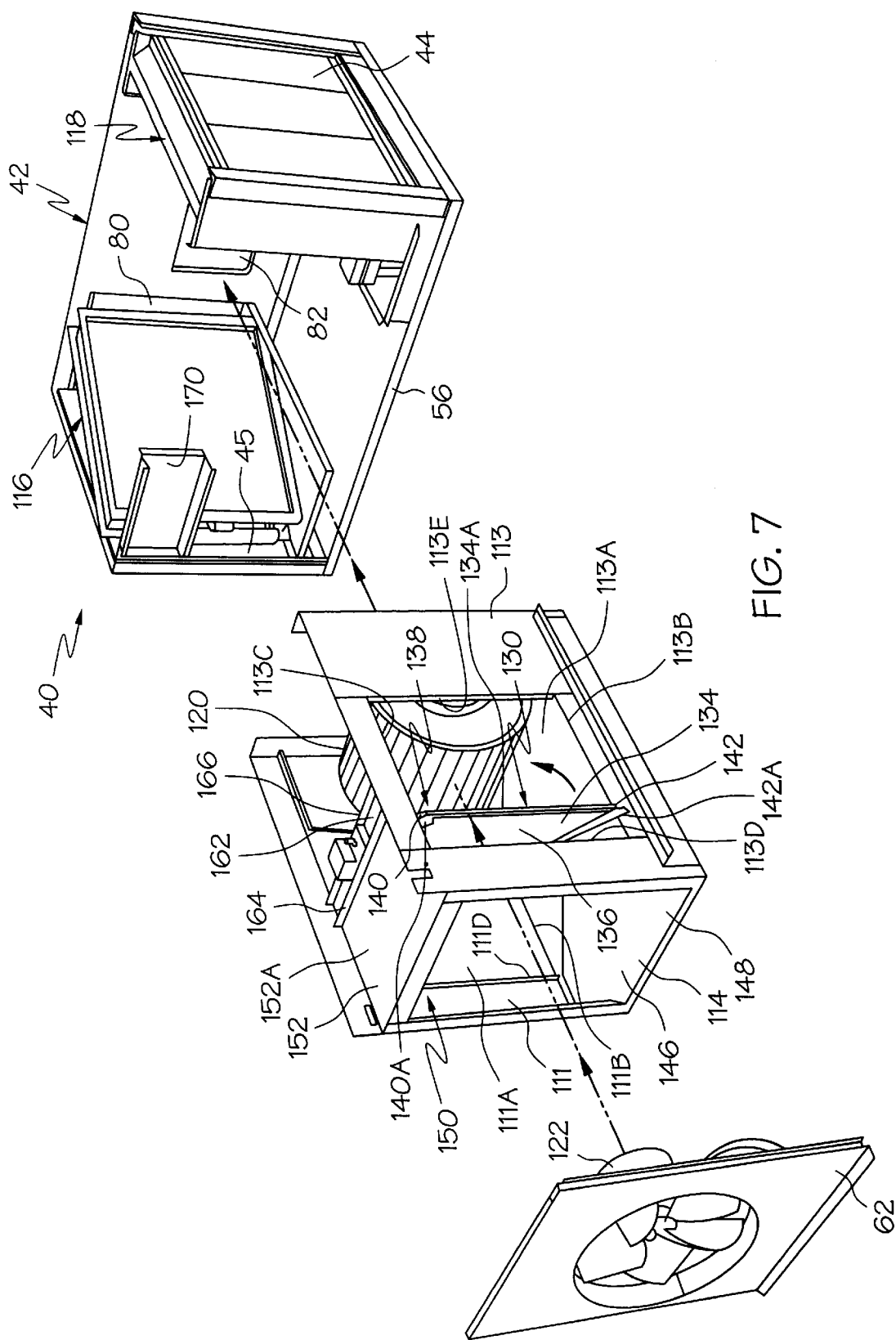
FIG. 7 is an exploded perspective view of the embodiment of the present invention depicted in combination with FIG. 1.

Attention is now directed to FIG. 7, which illustrates an exploded perspective view of unit 40, and further showing the specific structural elements herein previously discussed in greater detail. As can be seen, housing 42, further shown as having a closed end panel section 45, is shown having the air inlet port 80 and the air outlet port 82, with the air-conditioning apparatus 116 and the evaporative cooling apparatus 118 housed therein. Shown extracted from housing 42 is seen section 114 having the blower 120 and the damper 130 coupled therewith. Further seen spaced apart from section 114 is intermediate side panel 62 having fan 122 coupled therewith as has been herein previously discussed.

Figure 9:
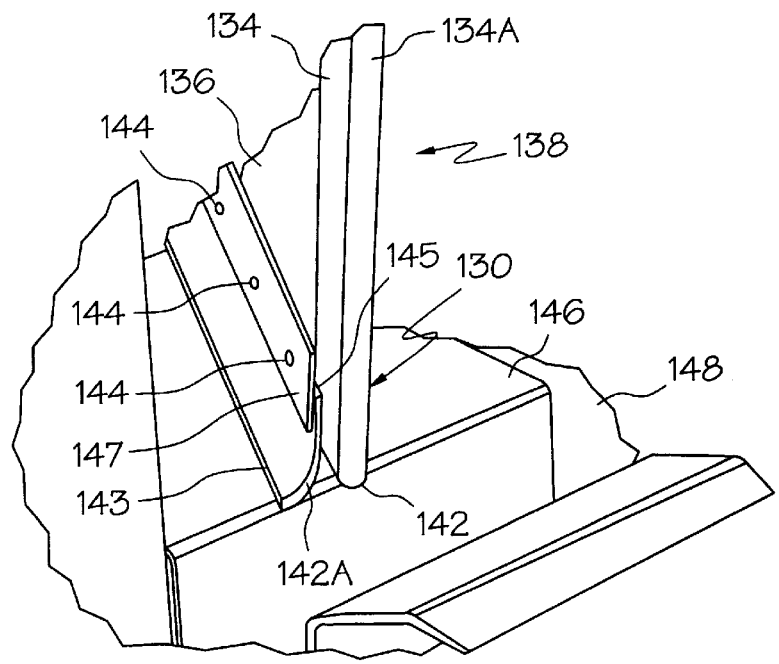
FIG. 9 is an enlarged fragmentary perspective view of a damper seen in cooperation with other portions of the present invention.

With respect to section 114 illustrated, seen is partition 113 having opening 113A extending therethrough being generally square in shape, and partition 111 having opening 111A extending therethrough and also being generally square in shape. The damper 130, further details of which can be seen in combination with FIG. 9, is comprised of an upstanding panel member 134 being substantially planar and preferably constructed of aluminum, stainless steel, or the like, and having a first substantially planar surface 136, a second substantially planar surface 138, an upper edge 140 and a lower edge 142. Suitably located across both the entire length of upper edge 140 and lower edge 142 are seen substantially compliant elongate fins, 140A and 142A respectively. Fin 142A, suitably constructed of rubber or other similarly compliant substance, includes a lower edge 143, and an upper edge 145. Fin 142A is fixedly coupled proximate portions of the upstanding panel member 134 proximate lower edge 142 by means of a substantially rigid elongate bracket 147 coupled to the fin 142A and the upstanding panel member 134 by means of rivets 144, although screws or other means may suitably be used in lieu thereof as selectively and suitably desired. Although not herein specifically described, fin 140A is of substantially identical construction as fin 142A.

Figure 8:
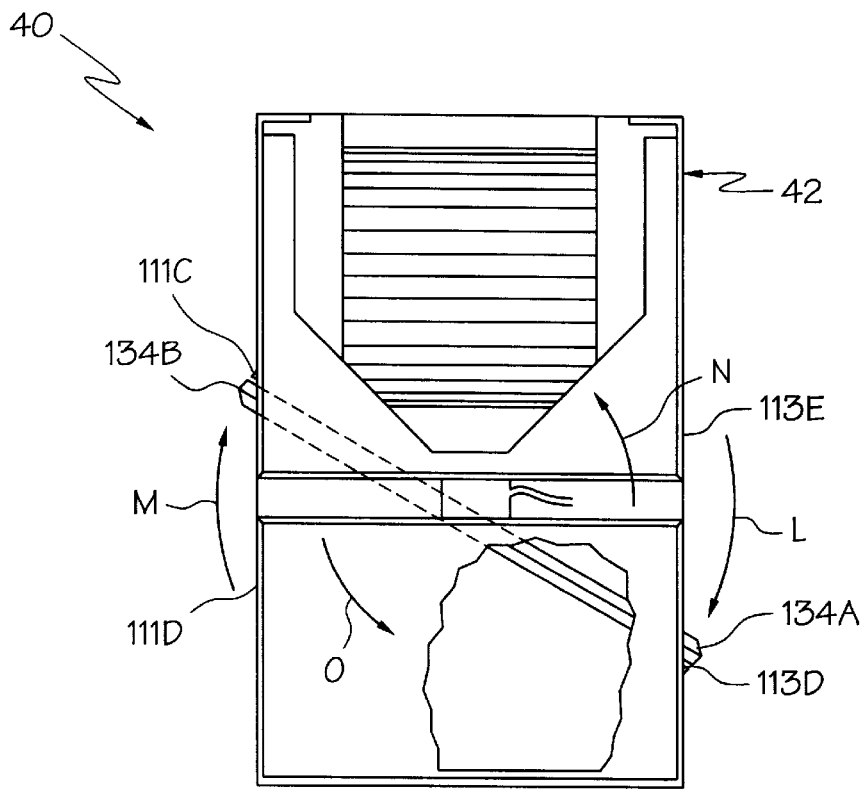
FIG. 8 is a top plan view of the present invention with portions therein being broken away for the purpose of illustration.

In operation, damper 130 pivots in horizontal displacement along pivotal mount 131 between the first configuration and the second configuration as herein discussed. As it pivots, fin 142A rides along an upper surface 146 of a lower panel section 148 of section 114, and a lower edge 113B of opening 113A, and a lower edge 111B or opening 111A, and all further in substantially sealing engagement. Similarly, fin 140A rides along a lower surface 150 of an upper panel section 152 of section 114, and an upper edge 113C or opening 113A, and an upper edge (not herein specifically shown) of opening 111A, and further all in substantially sealing engagement. Furthermore, as can also be seen in FIG. 8, when damper 130 is disposed in the first configuration as shown and as indicated by arrowhead lines L and M, portions proximate a first outer edge 134A of upstanding panel member 134 are sealingly engaged with a first side edge 113D of opening 113A, while portions proximate a second outer edge 134B of upstanding panel member 134 are sealingly engaged with a second side edge 111C of opening 111A.

When damper 130 is disposed in the second configuration, portions proximate the first outer edge 134A of upstanding panel member 134 are sealingly engaged with a second side edge 113E of opening 113A, while portions proximate the second outer edge 134B of upstanding panel member 134 are sealingly engaged with a first side edge 111D of opening 111A.

Figure 10:
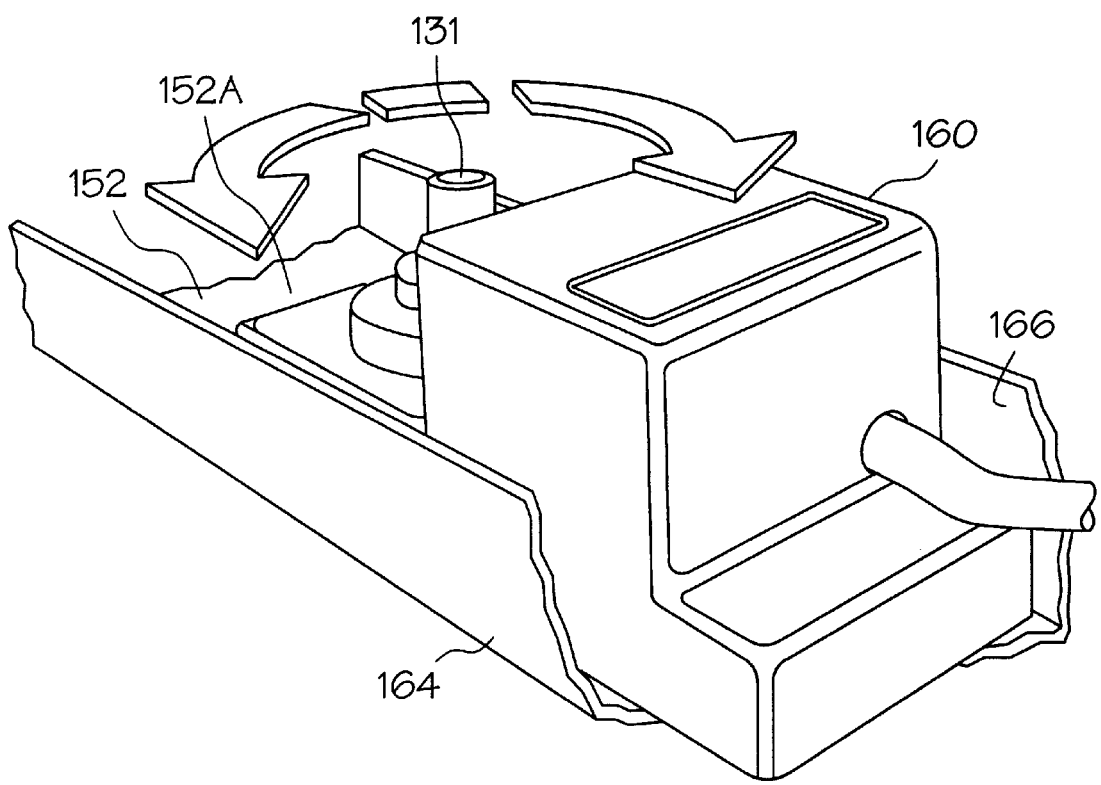
FIG. 10 is an enlarged fragmentary perspective view of a switch.
Figure 11:
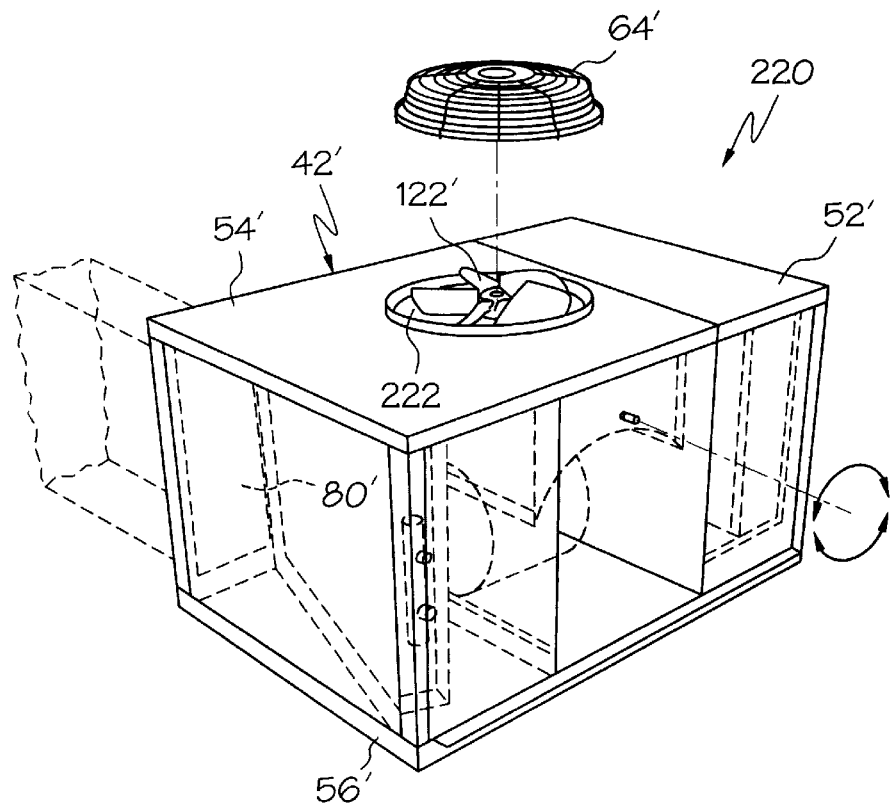
FIG. 11 is a partial exploded rear perspective view of an alternate embodiment of the present invention.
Figure 12:
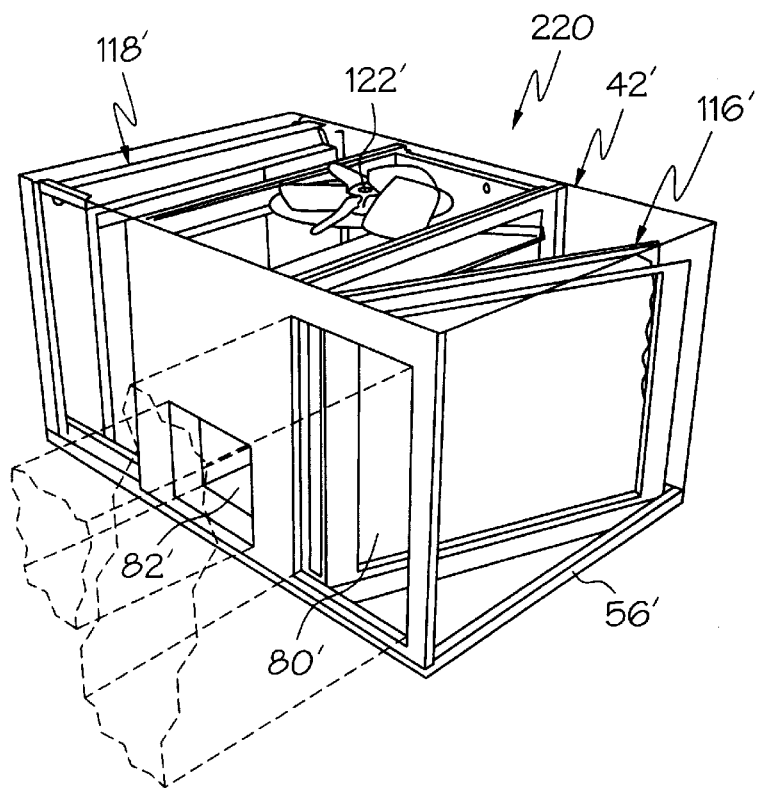
FIG. 12 is a rear perspective view of the embodiment first depicted in combination with FIG. 11 with portions therein broken away for the purpose of illustration.
Figure 13:
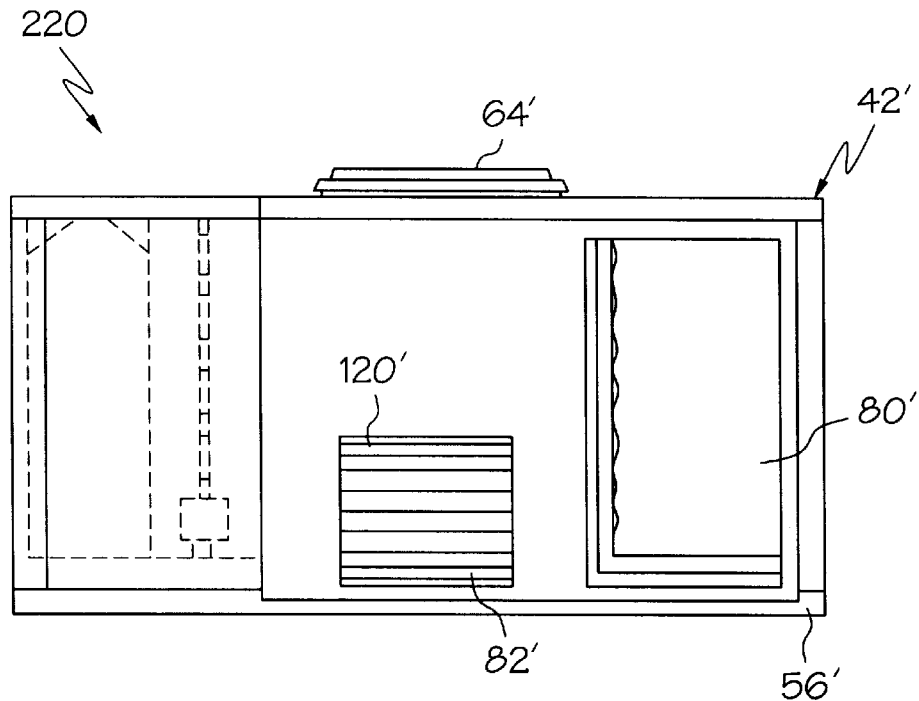
FIG. 13 is a rear elevation view of the embodiment first depicted in combination with FIG. 11.
Figure 14:
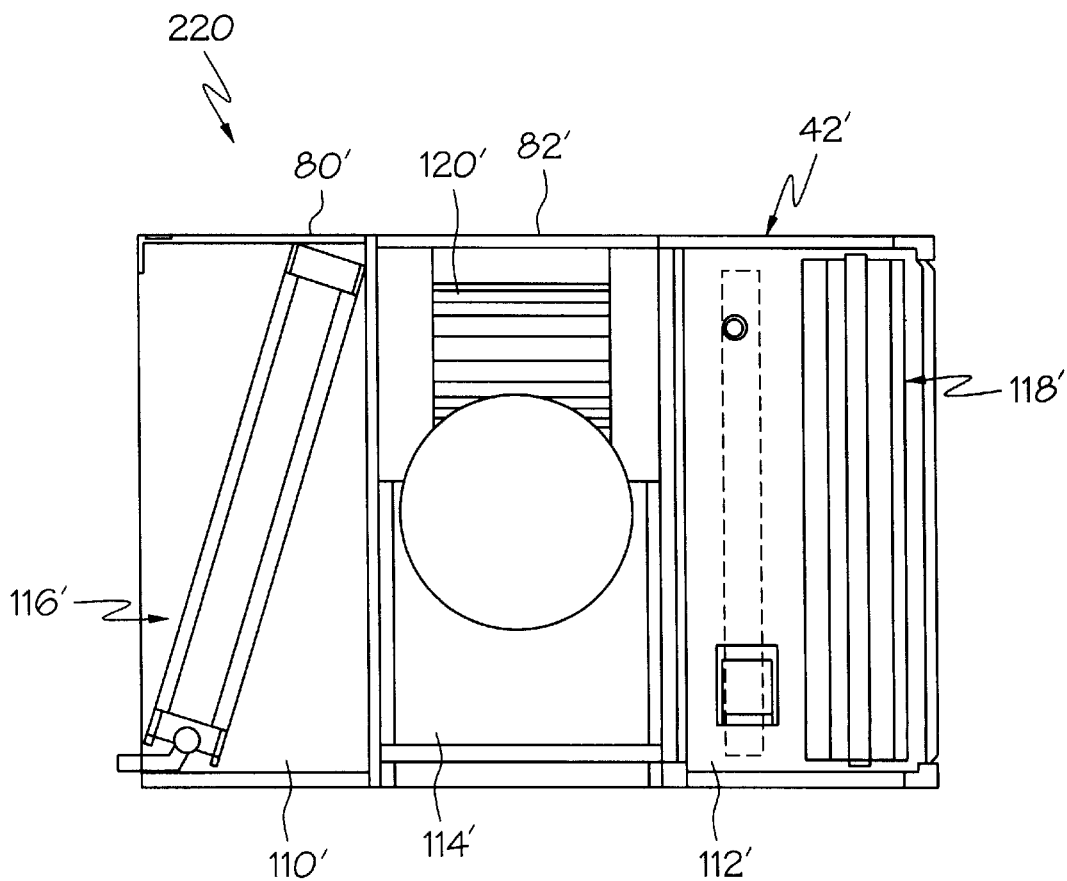
FIG. 14 is a top plan view of the embodiment depicted in combination with FIG. 13.

With continuing reference to FIG. 7, and further reference to FIG. 10, unit 40 includes a motor-driven actuator mechanism 160 operational for displacing the damper between the first configuration and the second configuration. The actuator mechanism 160, seen housed within a channel 162 defined by two upstanding side walls, 164 and 166, coupled to portions of an upper surface 152A of upper panel section 152, is of the conventional type. Accordingly, the specific details of the actuator mechanism 160 will not be herein specifically addressed as they will be readily apparent to those having ordinary skill in the relevant art.

Figure 20:
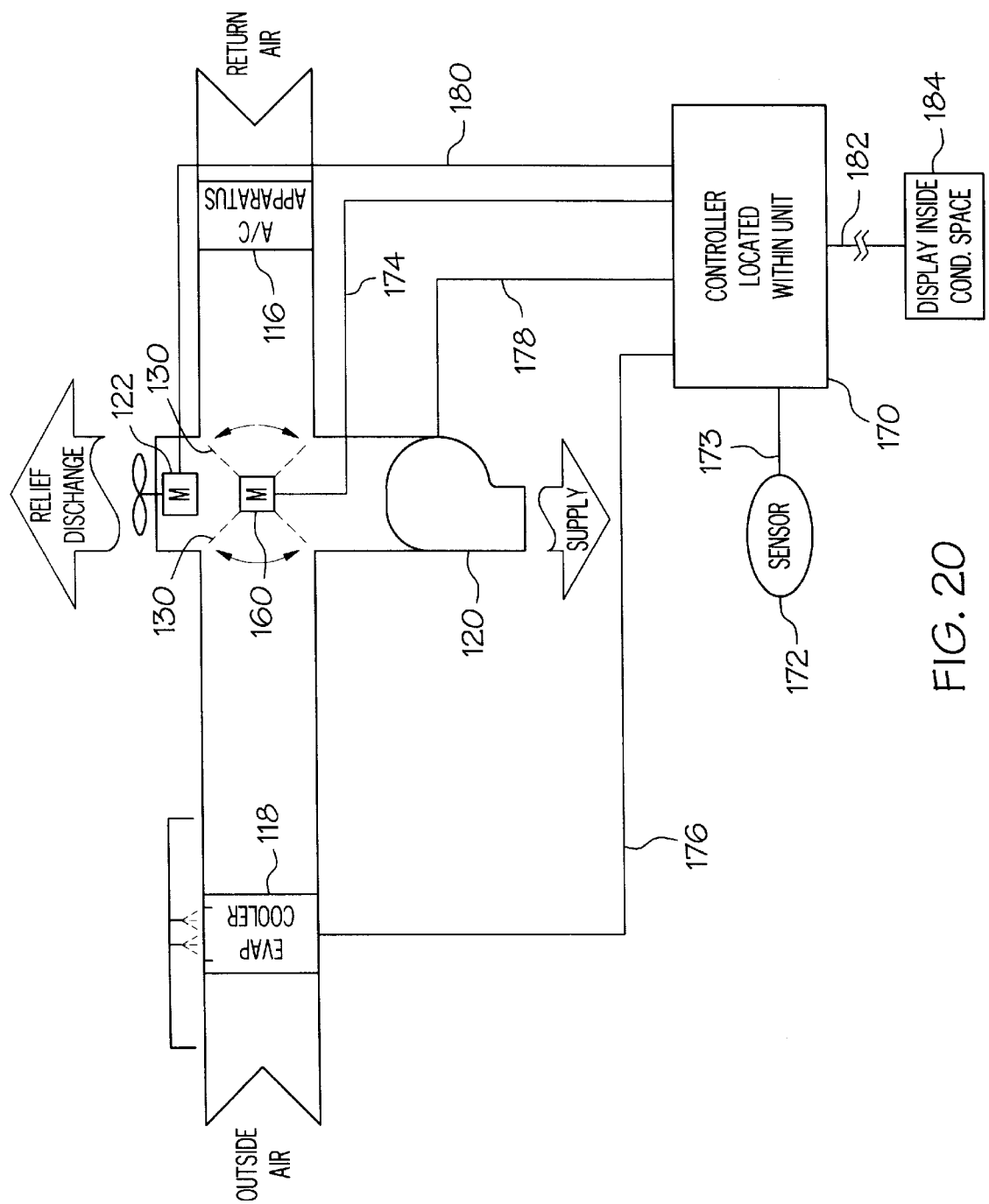
FIG. 20 is a schematic representation of an embodiment of the present invention consistent for use in combination with the embodiment depicted in combination with FIG. 1, and for use in combination with the embodiment depicted in combination with FIG. 11.

Referring again to FIG. 7, and taken in conjunction with FIG. 20, and the previous description herein directed towards FIG. 3 and FIG. 4, unit 40 includes a controller 170 that is in electrical communication with the air-air-conditioning apparatus 116, the evaporative cooling apparatus 118, the blower 120, the fan 122, and the damper 130. As has been earlier discussed, as is typical with conventional evaporative cooling systems and apparatus, the cooling efficiency of the evaporative cooler apparatus 118 decreases when the 1% coincident wet bulb temperatures are high, of which will be understood by those having ordinary skill with respect to evaporative cooling systems and apparatus. Accordingly, as 1% coincident wet bulb temperatures increase, the cooling capabilities of the evaporative cooling apparatus 118 becomes less effective in keeping the enclosed space of a structure proximate a selectively desired comfort level. However, as is typical with conventional air-conditioning systems, air-conditioning apparatus 116 usually always operates quite well regardless of the external environmental temperature.

However, since typical air-conditioning systems use more electrical power than conventional evaporative cooler systems, it is not very economical to use air-conditioning apparatus 116 exclusively when cooling the enclosed space of a structure. Yet, since evaporative cooling systems and apparatus, although less expensive to operate, serve as a sufficient cooling means only when the external environmental conditions permit, the controller 170 is coupled to a sensor 172 operative for sensing the external environmental conditions such as the temperature and humidity and the wet bulb temperatures.

Accordingly, when unit 40 is actuated, the sensor 172 senses the external environmental conditions and communicates the information via electrical interconnection 173 to controller 170. If the external environmental conditions are sensed as being suitable for operation of the evaporative cooling apparatus 118 for cooling the enclosed space of a structure, the controller sends an electrical signal via electrical interconnection 174 to the actuator mechanism 160 which in turn disposes damper 130 in the first configuration. Additionally, the controller 170 further sends an electrical signal via electrical interconnection 176 to the evaporative cooling apparatus 118 for actuating the evaporative cooling apparatus 118, sends an electrical signal via electrical interconnection 178 to the blower 120 for actuating the blower 120, and sends an electrical signal via electrical interconnection 180 to the fan 122 for actuating the fan 122.

If the external environmental conditions are sensed by the sensor 170 as being unsuitable for efficient operation of the evaporative cooling apparatus 118 for cooling the enclosed space of a structure, the controller sends an electrical signal via electrical interconnection 174 to the actuator mechanism 160 which in turn disposes damper 130 in the second configuration. Additionally, the controller further sends an electrical signal via electrical interconnection 176 to the evaporative cooling apparatus 118 for turning it off, sends an electrical signal via electrical interconnection 178 to the blower 120 for actuating the blower 120, and sends an electrical signal via electrical interconnection 180 to the fan 122 for either actuating the fan 122, or turning the fan 122 off, whichever is selectively desired by the user.

As can be seen from FIG. 20, controller 170 is connected by means of electrical interconnection to a display panel 184 which displays a variety of data consistent with the use and operation of unit 40. Preferably mounted within a structure for facilitating easy access by a user, display panel 184 in FIG. 19 includes a liquid crystal display 186 for displaying the data and includes a plurality of buttons cooperative therewith for inputting a variety of information. For instance, button 188 is operative for allowing a user to display the operating mode of unit 40, such as whether the unit 40 is heating or cooling. Button 190 is operative for inputting a selected temperature or temperature range, conforming to a selected comfort level that a user desires the enclosed space to be set. Buttons 192 and 194 enable one to display on the display 186 the inside temperature and the outside temperature respectively. Additionally, button 196 allows one to reset the entire system. Furthermore, buttons 198, 200, and 202, are operative for allowing one to display the operation status, the day, and the time of day, respectively.

Figure 19:
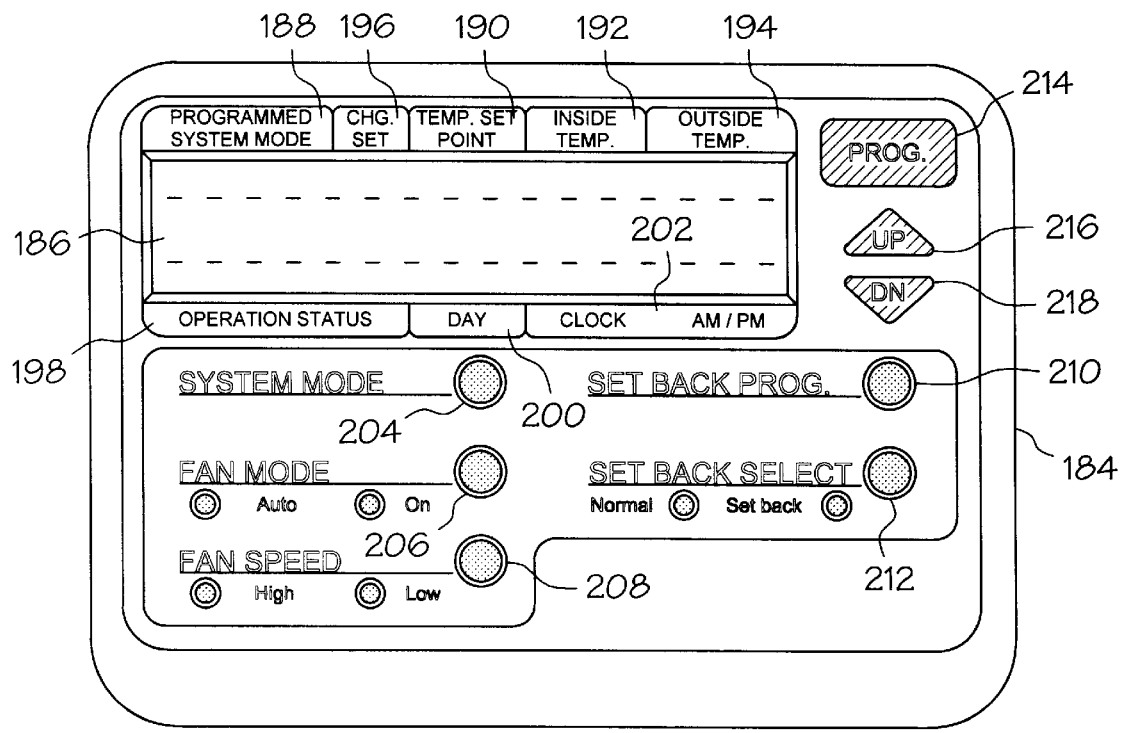
FIG. 19 is a top plan view of a control panel of the present invention.

With continuing reference to FIG. 19, the display panel 184 also includes a system mode button 204 to allow one to set the operating mode of unit 40 to either heating or cooling, a fan mode button 206 for allowing one to either operate fan 122 manually, or for allowing the fan 122 to work automatically. Fan speed button 208 allows one to adjust the speed of fan 122 to either high or low, and the set back program button 210 and the set back select button 212 enable one to select specific running times for selective and automatic operation of unit 40. Finally, program button 214, used in combination with up button 216 and down button 216, allow one to selectively scroll along a set menu of selected program modes.

As it will be understood, once a selected operating mode has been programmed into controller 170 by means of display panel 184, the unit 40 will operate automatically without manual adjustment for either selectively heating or cooling the enclosed space of a structure to maintain the enclosed space proximate a selectively desired comfort level. When cooling, controller 170 will selectively switch the unit 40 back and forth from the first configuration to the second configuration for allowing optimal cooling efficiency while conserving electricity and water used by the evaporative cooling apparatus 118. Furthermore, when the unit 40 is in heating mode thereby heating the enclosed space of a structure, the unit will be configured in the second configuration.

The damper 130, in combination with the controller 170 and its associated elements, serve as a control means operative as a control mechanism for automatically and selectively switching the unit 40 from the first configuration to the second configuration, for maintaining the environment in the enclosed space of a structure proximate a selectively desired comfort level, and for exploiting the operating efficiency of the air-conditioning apparatus 116 and the evaporative cooling apparatus 118 in combination with the external environmental conditions for providing efficiently conditioned air into the enclosed space and for conserving utilities.

Turning now to FIG. 11, FIG. 12, FIG. 13, FIG. 14, FIG. 15, and FIG. 16, there is seen an alternate embodiment of the present invention generally designated by the reference character 220, which in general similarity to the previously described embodiment generally designated by the reference character 40 includes substantially the same elements. For the purposes of clarity, the specifically referenced common parts will be indicated consistent with those specifically described in combination with unit 40. However, the instant reference characters will further include a prime symbol, such as for example (reference character)'. Accordingly, like unit 40, heating and cooling unit includes housing 42' having the end panel 44', the removable first top panel 52', the removable second larger top panel 54', and base panel 56'. Also included is air inlet port 80', air outlet port 82', section 110', section 112', section 114', the air-conditioning apparatus 116', the evaporative cooler apparatus 118', the blower 120', the fan 122', the protective grating 64', the damper 130', and the actuator mechanism 160'.

Figure 15:
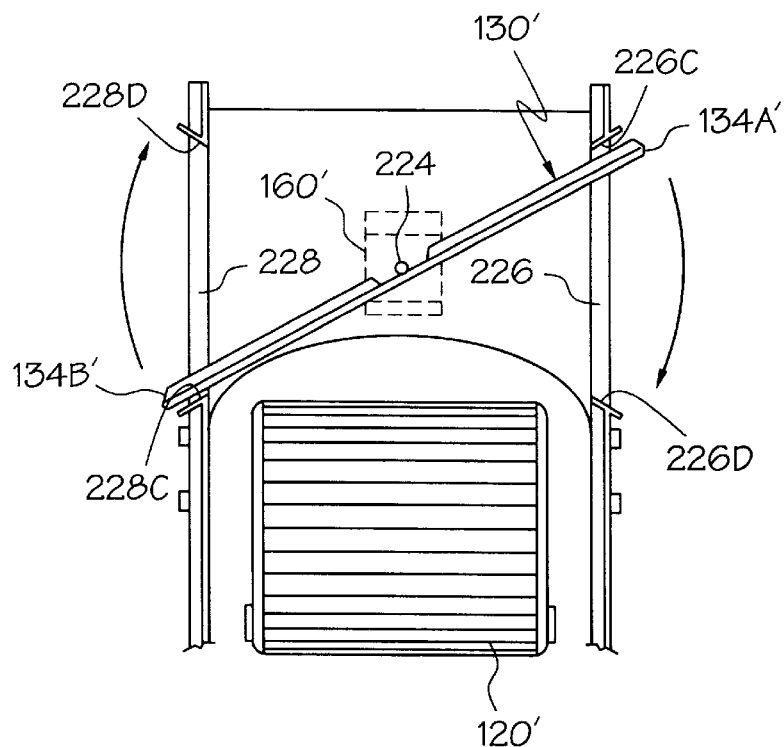
FIG. 15 is a fragmented rear elevation view of portions of the embodiment first depicted in combination with FIG. 11, and further illustrating a damper.
Figure 16:
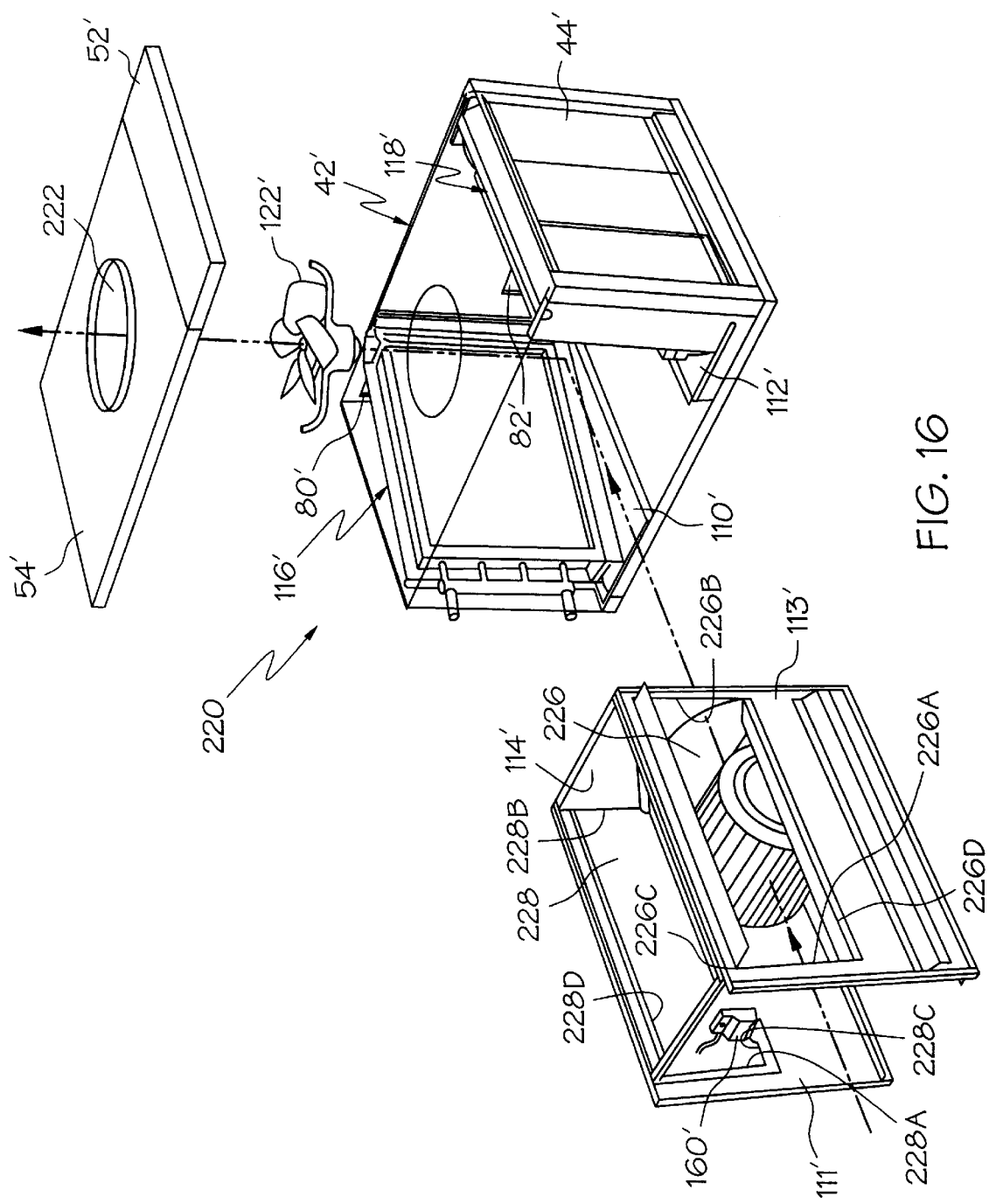
FIG. 16 is an exploded perspective view of the embodiment first depicted in combination with FIG. 11.

The immediate embodiment differs from the previous embodiment in that the fan 122' is disposed proximate an exhaust port 222 formed through portions of the second larger top panel 54', which can further be seen in FIG. 16. Additionally, damper 130', of which can be seen in FIG. 15, is mounted to portions of housing 42' proximate section 114' by means of a pivotal mount 224, the damper 130' being mounted for reciprocal vertical pivotal movement.

With respect to section 114' illustrated in FIG. 15 and FIG. 16, and as previously described section 114, partition 113' includes opening 226 extending therethrough being generally rectangular in shape and being defined by side edges, 226A and 226B respectively, and upper and lower edges, 226C and 226D respectively. Similarly, partition 111' includes opening 228 extending therethrough and also being generally rectangular in shape and being defined by side edges, 228A and 228B respectively, and lower and upper edges, 228C and 228D respectively. The specific details of damper 130', of substantially identical construction to damper 130, will not be herein again specifically described, as they have been herein specifically described in combination with FIG. 7, FIG. 8, and FIG. 9.

Figure 17:
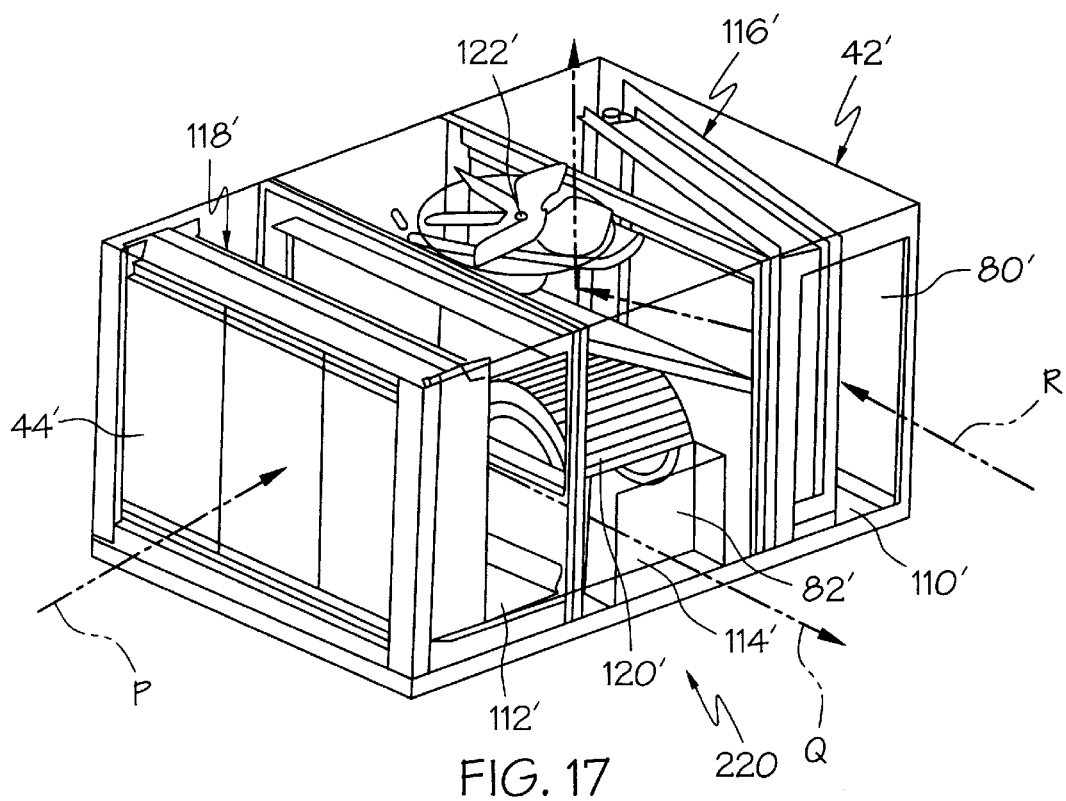
FIG. 17 is a perspective view of the embodiment first depicted in combination with FIG. 11 with portions therein being broken away for the purpose of illustration.
Figure 18:
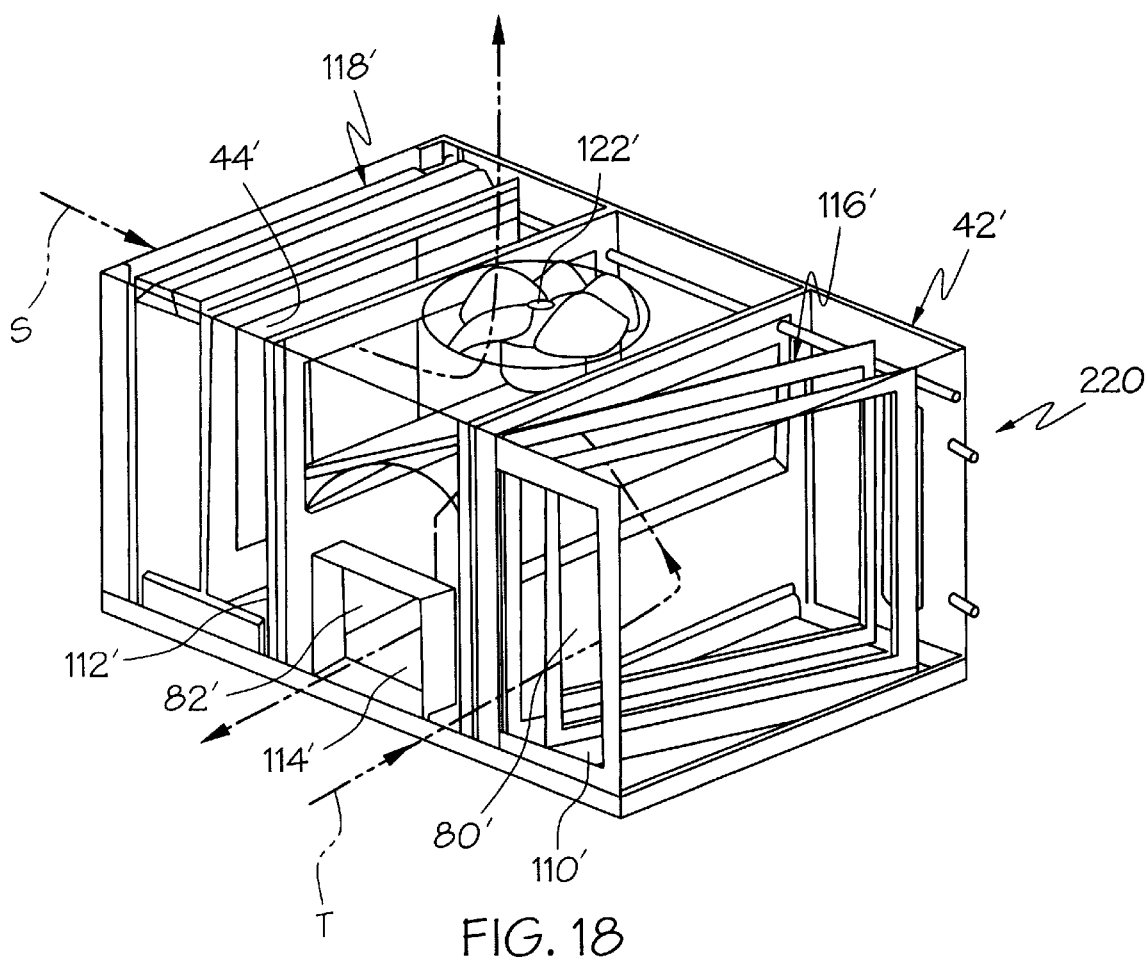
FIG. 18 is a view very similar to the view of FIG. 17.

With continuing reference to FIG. 15 and FIG. 16, and additional reference to FIG. 17 and FIG. 18, damper 130' is movable between the first configuration and the second configuration. In particular, when damper 130' is disposed in the first configuration as shown in FIG. 15, and FIG. 17, portions proximate the first outer edge 134A' of damper 130' are sealingly engaged with upper edge 226C of opening 226, while portions proximate the second outer edge 134B' of damper 130' are sealingly engaged with lower edge 228C of opening 228.

In this first configuration, as can be seen in FIG. 16, when blower 120' is operating and thereby sucking air in from outside unit 220, and blowing the air into the enclosed space or a structure, the air passes in the direction indicated by arrow P through end panel 44', into section 112' and through evaporative cooling apparatus 118'. From the evaporative cooling apparatus 118', the air then passes through opening 226 and into section 114' and against portions of damper 130', into the blower 120', and out from the blower 120' through air outlet port 82' and into the enclosed space of a structure in the direction as indicated by arrow Q. Furthermore, when unit 220 is actuated, both the blower 120' and fan 122' are actuated and operational. Fan 122' operates for blowing air provided from the enclosed space out of exhaust port 222 which indicates that fresh air provided from outside the unit 220 is constantly being supplied into the structure and then selectively expelled as exhaust from exhaust port 220.

Once the air has been introduced into the enclosed space of the structure, the air is then drawn out of the enclosed space, either directly or indirectly as through ducts, by fan 122' and further as a result of the positive pressure buildup within the structure. As a result, the air passes in the direction indicated by jagged arrow R into section 110' through air inlet port 80' and through the air-conditioning apparatus 116' which is turned off when the evaporative cooling apparatus 118' is running. From the air-conditioning apparatus 116', the air then passes through opening 228 and into section 114' and against portions of damper 130', through fan 122' and upwardly out of exhaust port 222.

When damper 130 is disposed in the second configuration, portions proximate the first outer edge 134A' of damper 130' are sealingly engaged with the lower edge 226D of opening 226, while portions proximate the second outer edge 134B' of damper 130' are sealingly engaged with the upper edge 228D of opening 228.

Referring to FIG. 18, the damper 130' is shown disposed in the second configuration. In the second configuration, the evaporative cooling apparatus 118' is not operational, and the air-conditioning apparatus 116' operational for either heating the enclosed space, or cooling the enclosed space. In the second configuration, and as indicated by the jagged arrow S, air from outside unit 220 can be seen as passing through end panel 44' and into section 112'. From section 112', the air then passes through opening 226 and into section 114', the air then being directed against portions of damper 130' and then upwardly out the exhaust port 222. Further provided in this second configuration, the air-conditioning apparatus 116' is operational with blower 120' blowing and re-circulating the air within the enclosed space of the structure, the air-conditioning apparatus 116' operative for either selectively cooling or heating the air.

In further detail, air from the enclosed space of the structure passes in the direction indicated by jagged arrow T through air inlet port 80' and into section 110'. From section 110', the air then passes through the air-conditioning apparatus 116' and is either heated or cooled. From the air-conditioning apparatus 116', the air then passes through opening 228 into section 114' and then passes against portions of damper 130', through blower 120' and is then projected from the blower 120 through air outlet port 82' and into the enclosed space either directly or indirectly by means of a duct.

Figure 21:
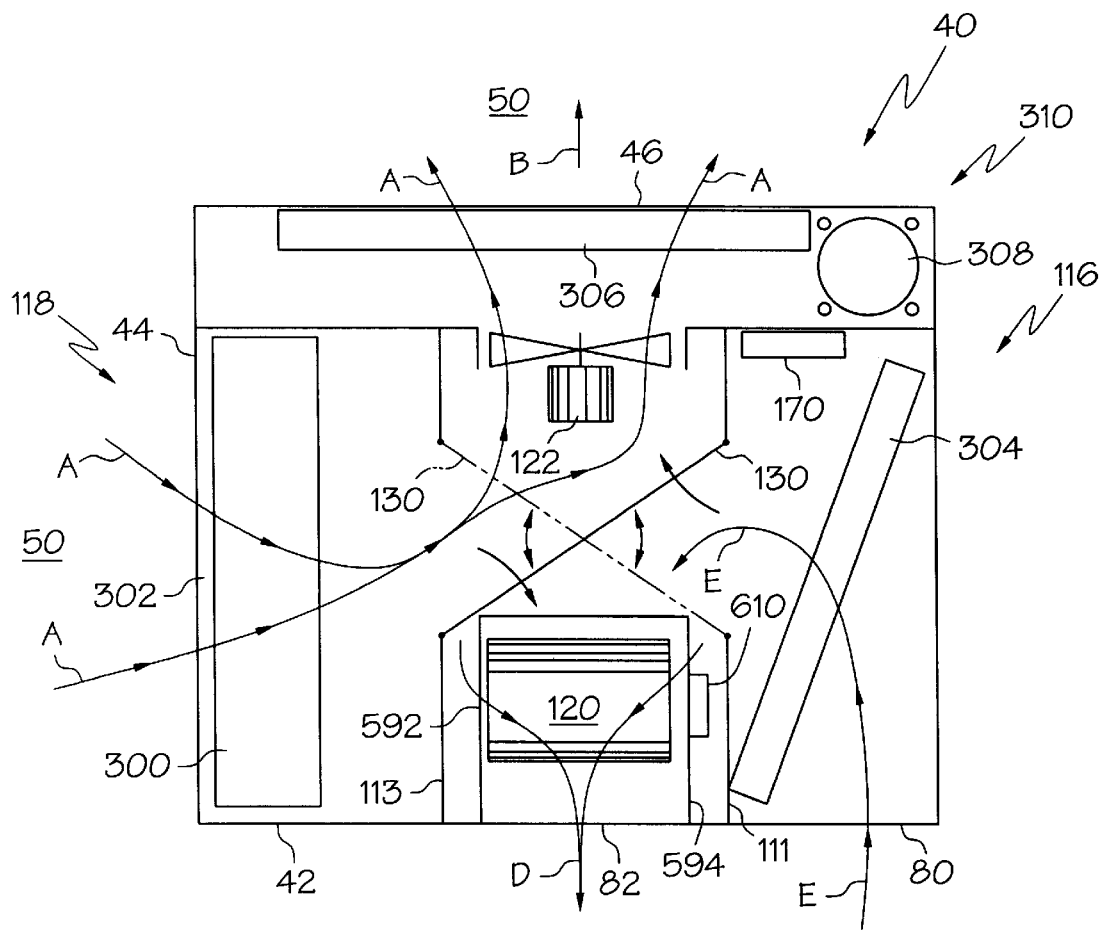
FIG. 21 shows a top view of a heating and cooling apparatus in accordance with a preferred embodiment of the present invention.

FIG. 21 shows a top view a preferred embodiment of heating and cooling unit 40 in accordance with the present invention. A cooling pad 300 is located inside housing 42 at side end panel 44 that defines a main or external inlet 302 of heating and cooling unit 40. Arrow A indicates the passage of external air from outside external environment 50, as flowing into unit 40 through external inlet 302. Air that has been either heated or cooled by unit 40 is moved by blower 120 through air outlet port 82 to enclosed space 48 (FIG. 1), as indicated by arrow D. Arrow E indicates that unit 40 receives air from enclosed space 48 through inlet port 80. Unit 40 either re-circulates the air back into the structure (arrow D), or expels the air through exhaust port 46 to external environment 50 (arrow B).

Airflow inside housing 42 is directed by positioning damper 130 in either a closed position or second configuration (solid line) or an open position or first configuration (dashed line). In the open position and the closed position, damper 130 controls airflow through external inlet 302, outlet port 82, inlet port 80, and exhaust port 46. When damper 130 is configured in the open position (dashed line), air from external environment 50 passes through cooling pad 300 and is moved by blower 120 through outlet port 82 into enclosed space 48. In the open position, exhaust fan 122 functions as an air movement device that moves air from inlet port 80 through evaporative coils or evaporator 304, through condenser coils or condenser 306 and through exhaust port 46 to external environment 50. Exhaust fan 122 exhausts air from enclosed space 48 to prevent the pressure build-up and its undesirable effects as discussed in the background section. When damper 130 is in the closed position (solid line) and exhaust fan 122 is energized, exhaust fan 122 moves air from external environment 50 through external inlet 302, cooling pad 300, condenser 306, through exhaust port 46 to external environment 50. Those skilled in the art will realize that by moving air through condenser 306, exhaust fan 122 increases heat transfer capability of condenser 306 which translates into an increase in air conditioner and condenser efficiencies. In addition, blower 120 moves air into enclosed space 48 through outlet port 82, forcing air from enclosed space 48 through inlet port 80, evaporator 304, and back to blower 120.

FIG. 21 shows a compressor 308 inside housing 42 to be proximate evaporator 304 and condenser 306. For a preferred embodiment of the present invention, evaporator 304, condenser 306, and compressor 308 are coupled together to form air-conditioning or refrigerating apparatus 116. In this and other preferred embodiments, apparatus 116 is configured to exploit a conventional refrigeration cycle that transfers heat from a low temperature area (enclosed space 48) to a high temperature area (external environment 50). In another preferred embodiment, evaporator 304, condenser 306, and compressor 308 are configured to form a heat pump or heat pumping apparatus 310. In this configuration, heat pumping apparatus 310 reverses the conventional refrigeration cycle to supply heated air to enclosed space 48 as needed. There is no significant difference in the mechanisms or construction of heat pumping apparatus 310 and refrigeration apparatus 116 and their conventional refrigeration cycles are the same. However, heat pumping apparatus 310 can reverse its refrigeration cycle to supply enclosed space 48 with heated air while refrigeration apparatus 116 cannot reverse its refrigeration cycle and can supply only cooled air to enclosed space 48. The present invention applies equally well to refrigeration and heat pump devices in a like manner.

FIG. 21 also shows controller 170 inside housing 48, which for one embodiment is a programmable controller that receives user-supplied input from display panel 184 (FIGS. 19 and 20). Controller 170 uses motor drive actuator 160 (FIG. 20) to dispose damper 130 in the closed or open position. Controller 170 selects either the open or closed position in response to the ambient temperature and relative humidity of external environment 50. For the embodiment where controller 170 is a programmable controller, the open or closed position is selected in response to the ambient temperature, ambient relative humidity and a user-supplied comfort level. When in the open position, unit 40 energizes exhaust fan 122 to run continuously and exploits evaporative cooling apparatus 118. When in the closed position, unit 40 energizes exhaust fan 122 to run at predetermined intervals for a predetermined duration and exploits refrigeration apparatus 116.

In one embodiment of the present invention controller 170 selectively defaults damper 130 to the closed position when the open position is not the selected configuration. This prevents external air from entering through exhaust port 46 and moving in a back-flow direction through inlet port 80. Typically an air filter is located between enclosed space 48 and inlet port 80 and air moving in this reverse or back-flow direction would tend to back wash this air filter, dumping dirt and debris collected by the filter into enclosed space 48. Since exhaust fan 122 is running continuously when damper 130 is disposed in the open position, air from external environment 50 is prevented from undesirably entering through exhaust port 46 and moving in a back-flow direction through inlet port 80 to enclosed space 48. Moreover, when damper 130 is in the closed position damper 130 prevents air from external environment 50 from undesirably entering through exhaust port 46 and moving in a back-flow direction through inlet port 80 to enclosed space 48. When windy ambient conditions exist, back-flows as described above can occur in conventional cooling units that use pneumatic pressure to actuate and hold the damper in position. Such back-flows not only reduce cooling efficiency of the unit but can also clog and damage the evaporator as previously discussed in the background.

Figure 22:
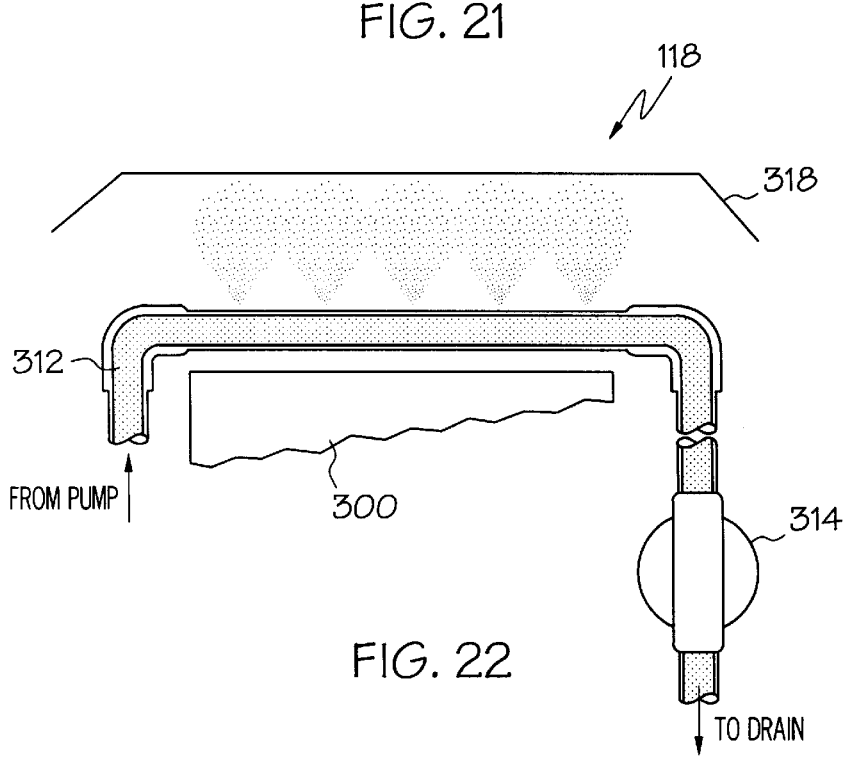
FIG. 22 shows an abbreviated side view of an evaporative cooling apparatus in accordance with a preferred embodiment of the present invention.

FIG. 22 shows an abbreviated side view of evaporative cooling apparatus 118 that has a cooling water line 312, a cooling pad 300 and a dump valve 314. A pump 316 (FIG. 23) moves cooling water through cooling water line 312 past a section of water line that has a quantity of regularly spaced openings oriented in an upward position as shown. As pressurized cooling water flows through this section of water line 312, a water spray is emitted by the openings. The water spray is deflected downward onto cooling pad 300 by a water spray deflector shield 318. Cooling pad 300 is made of a medium that temporarily retains a portion of this water spray such that air passing through cooling pad 300 is cooled by evaporation of the retained water.

For the embodiment shown in FIG. 22, dump valve 314 is located at an end of cooling water line 312 that is downstream of the last opening. When dump valve 314 is closed, water sprays from the openings as shown. However, after time the openings would tend to get clogged with mineral deposits from the cooling water, but for a dumping operation discussed below. Openings furthest away from pump 316 would tend to clog first since water flow rates near the capped end or closed dump valve 314 of water cooling line 312 are significantly lower than water flow rates closer to pump 316. By periodically opening dump valve 314 during operation of pump 316, mineral deposits around the openings are flushed out of cooling water line 312. This operation is discussed in more detail below in connection with FIG. 27. Consequently, the openings tend to clog more slowly than occurs in systems which bleed off a portion cooling water prior to the openings.

Figure 23:
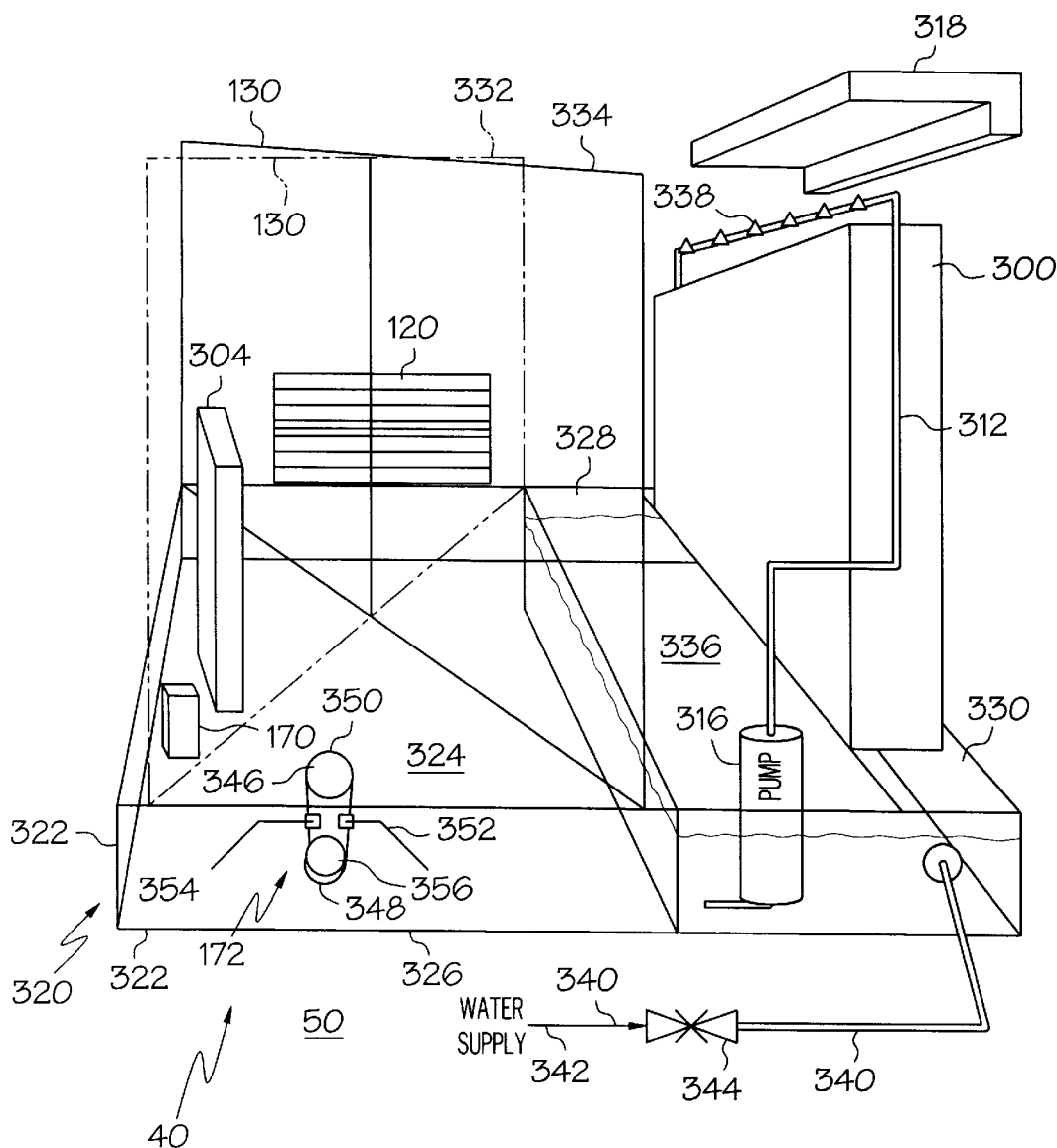
FIG. 23 shows a schematic view of a heating and cooling apparatus in accordance with a preferred embodiment of the present invention.

FIG. 23 shows a schematic view of heating and cooling unit 40 for a preferred embodiment of the present invention. Unit 40 is shown having a rectangular base 320 consisting of a rectangular box section 322 having a top section 324 and a bottom section 326 that adjoin a reservoir 328. Evaporator 304 and controller 170 rest on top section 324, proximate a side of box section 322 that is furthest away from reservoir 328. Cooling pad 300 rests on a reservoir shelf 330 that is approximately level with top section 324. Reservoir shelf 330 is positioned on a side of reservoir 328 that is furthest from box section 322. Damper 130 is located between evaporator 304 and cooling pad 300 and is shown being pivotally mounted to top section 324 of box section 322 at a generally intermediate position of damper 130. Motor drive actuator mechanism 160 (FIG. 20) is configured to pivotally move damper 130 (FIG. 23) to either a first configuration 334 (solid line position) or a second configuration 332 (dashed line position). A bottom section of blower 120 is located substantially level with top section 324 and blower 120 has an axis positioned substantially perpendicular to evaporator 304, at one end of box section 322. When damper 130 is in first configuration 334 (solid line), blower 120 moves air through cooling pad 300 to exploit evaporative cooling apparatus 118 (FIG. 21). When damper 130 (FIG. 23) is in second configuration 332 (dashed line), blower 120 moves air through evaporator 304 to exploit air-conditioning apparatus 116 (FIG. 21).

FIG. 23 shows reservoir 328 holding an amount of cooling water 336 and pump 316 that moves cooling water 336 through cooling water line 312. When dump valve 314 (FIG. 22) is closed and pump 316 is operating, cooling water 336 in cooling water line 312 sprays out of openings 338. Water spray deflector shield 318 directs the water spray onto cooling pad 300. Water not retained or evaporated drains through cooling pad 300 and returns to reservoir 328. A reservoir inlet valve 344 is located in an inlet water line 340 connecting an inlet side of valve 344 to a water supply 342 and connecting an exit side of valve 344 to reservoir 328. In one embodiment of the present invention, when evaporative cooling apparatus 118 is inoperative for a predetermined amount of time, controller 170 opens dump valve 314 (FIG. 22), closes inlet valve 344 and energizes pump 316 to substantially empty reservoir 328. This operation is discussed in more detail below in connection with FIG. 25.

FIG. 23 also shows rectangular box section 322 having a sensor passage 346 that extends from an inlet opening 348 in bottom section 326 to an exit opening 350 in top section 324. Sensor passage 346 contains sensor 172 that includes a dry bulb temperature sensor 352 and a relative humidity sensor 354. Controller 170 energizes exhaust fan 122 (FIG. 21) to move air from external environment 50 (FIG. 23) beneath unit 40 through inlet opening 348 to exit opening 350 of sensor passage 346. Moving external ambient air over sensors 352 and 354 helps assure accurate measurement of external ambient temperature and relative humidity. For one embodiment of the present invention, controller 170 relies on external ambient temperature and external ambient relative humidity for selectively disposing damper 130 in either first configuration 334 or second configuration 332. The process of moving external ambient air over sensor 172 and relying upon resultant signals is discussed below in connection with FIG. 24. To obtain accurate measurements and to help prevent incorrect cooling device selection, ambient air is passed by the sensors prior to sensor sampling to ensure that the sensed air is ambient air and not stagnate air that has been residing proximate the sensors for an unacceptable period of time.

When damper 130 is in second configuration 332, controller 170 energizes exhaust fan 122 (FIG. 21) at predetermined intervals for a predetermined amount of time, prior to converting signals from dry bulb temperature sensor 352 (FIG. 23) and relative humidity sensor 354 into an ambient dry bulb temperature and an ambient dew point respectively. Moreover, in one embodiment of the present invention, when damper 130 is in first configuration 334, controller 170 energizes exhaust fan 122 to run continuously and continuously converts signals from temperature sensor 352 and relative humidity sensor 354. FIG. 23 shows an air filter 356 positioned inside sensor passage 346, proximate inlet opening 348. Air passes through filter 356 prior to contacting sensors 352 and 354, to filter out dirt and debris in external air entering from external environment 50. Filtering airborne dirt and debris prevents clogging sensors and causes accurate readings from temperature sensor 352, relative humidity sensor 354, and the like.

For one embodiment of the present invention, controller 170 is a programmable controller coupled to display panel 184 (FIG. 19) that receives user-supplied inputs from the display panel. FIGS. 24–29 are flowcharts showing control processing of an exemplary programmable controller. Those skilled in the art will realize that as a cost reduction means, user supplied input could be eliminated and a conventional controller could be used. However, using such a conventional controller would compromise the flexibility and versatility of the heating and cooling unit for only a modest reduction in cost. Moreover, for the embodiment depicted in FIGS. 24–29, the heating and cooling unit has control processing logic for six modes of operation, "OFF", "VENT", "HEAT", "EVAP", "AC", and AUTOMATED ("MYZR") mode.

Figure 24:
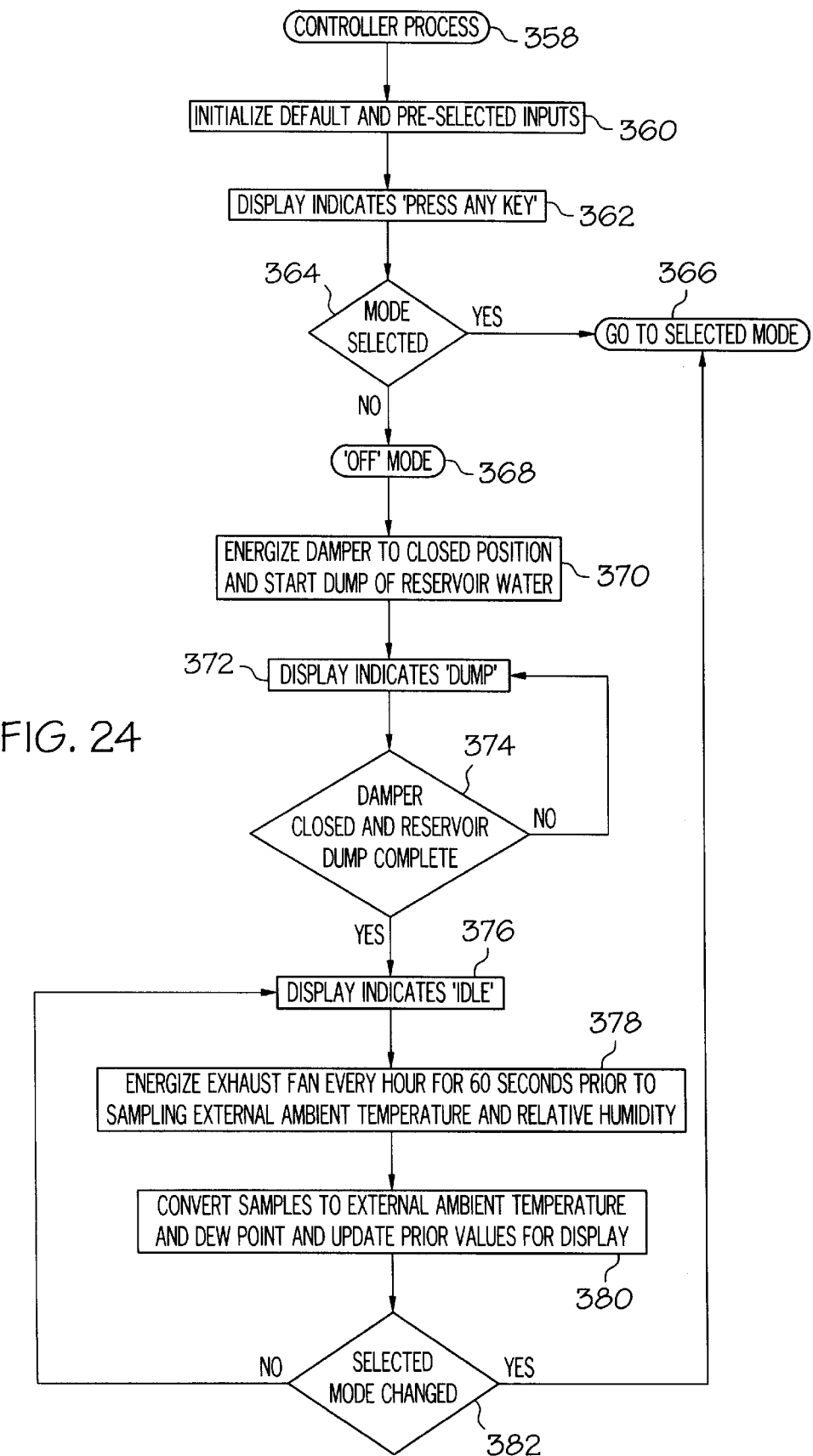
FIG. 24 shows a flowchart of a controller process for "OFF" mode selected operation of a preferred embodiment of the present invention.

FIG. 24 shows a flowchart of a controller process 358 used by an exemplary programmable controller for initial start up and "OFF" mode operation of an exemplary heating and cooling unit in accordance with a preferred embodiment of the present invention. With reference to FIGS. 19 and 24, controller process 358 begins by initializing selected controller memory inputs to factory default and pre-selected values in a task 360. These inputs can include setting a default exhaust fan speed to high, initializing all watch dog timers to zero and the like. At this time, display 186 of display panel 184 (FIG. 19) displays "PRESS ANY KEY" in a task 362.

Following task 362, a decision task 364 checks to see if system mode key 204 has been pressed and a mode selected. If a mode is selected, control passes to the control processing for that selected mode, as indicated by a connector task 366. When a display key other than system mode key 204 is pressed or if the mode selected is the "OFF" mode, "OFF" mode control processing begins at process 368.

Each of the six modes of operation mentioned above are user-selectable through display panel 184 (FIGS. 19 and 20). Selection of the "OFF" mode substantially empties the evaporator cooling water reservoir and limits control processing to sensor sampling at predetermined intervals. Sensor sampling in the "OFF" mode is done to maintain a relatively current status of sensed ambient conditions that can be displayed at display panel 184, which is typically located inside the enclosed space (FIG. 20).

Selection of the "VENT" mode substantially supplies ambient air to the enclosed space and does sensor sampling in a like manner as described in the "OFF" mode of operation, when cooling is not required.

Selection of the "HEAT" mode substantially reverses the refrigeration cycle of the refrigeration or heat pumping apparatus such that heated air is supplied to the enclosed space as required. Sensor sampling in the "HEAT" mode is done in a like manner as described in the "OFF" mode of operation.

Selection of the "EVAP" mode substantially supplies evaporatively cooled air to the enclosed space as required and does sensor sampling in a like manner as described in the "OFF" mode of operation, when cooling is not required.

Selection of "AC" mode substantially uses the refrigeration cycle of the refrigeration or heat pumping apparatus such that refrigerated or conditioned air is supplied to the enclosed space as required. Sensor sampling in the "AC" mode is done in a like manner as described in the "OFF" mode of operation.

When the AUTOMATED or "MYZR" mode is selected, the controller automatically selects between "AC" and "EVAP" modes of operation based on sensed ambient conditions. Once selected, the cooling unit operates in the selected mode until ambient conditions permit a change in operating mode selection or the user selects another operating mode through the display panel. In the "MYZR" mode, a history of sensor sampling is retained and is used to determine when to switch between "AC" and "EVAP" mode operation. The "MYZR" mode also uses the ambient sensor sampling for the display panel.

In a task 370 of "OFF" mode process 368, the controller energizes motor drive actuator mechanism 160 to dispose damper 130 in the closed position or second configuration 332 and begins dumping cooling water 336 out of reservoir 328 (see FIG. 23). In one embodiment, the controller closes reservoir inlet valve 344, opens dump valve 314 (FIG. 22) and energizes pump 316 (FIG. 23) to pump cooling water 336 from reservoir 328 through cooling water line 312 and dump valve 314 to an external drain (FIG. 22). After task 370 is started, the display indicates "DUMP" in a task 372. A decision task 374 checks for completion of task 370. While task 370 is in process the display continues to indicate "DUMP" and task 374 continues to monitor for the completion of the dump operation started in task 370. After completion of the dump operation the damper is configured in the closed position or second configuration and the reservoir is substantially emptied. Program control progresses from task 374 to a task 376. Task 376 changes the display to indicate "IDLE".

After task 376, control passes to a task 378, which energizes the exhaust fan at predetermined intervals for a predetermined duration prior to sampling the temperature sensor and the relative humidity sensor. For the embodiment shown, the predetermined interval is one hour and the predetermined duration is 60 seconds. When sampling the temperature sensor and the relative humidity sensor, the controller converts sensor signals from the temperature sensor and the relative humidity sensor into external ambient dry bulb temperature and external ambient dew point respectively, in a task 380. Those skilled in the art will realize that the conversion from relative humidity to dew point can be performed by simply referencing a lookup table. For purposes of the present invention, the term dew point is to be broadly construed to include alternate forms of temperature/humidity parameters, such as wet bulb temperature and the like. In the "OFF" mode, external ambient dry bulb temperature and external ambient dew point are used for display purposes only, as previously discussed. After task 380, processing passes to a decision task 382 that checks for a change in the selected mode. The selected mode can be change by user-supplied input from the display panel and by control processing in the AUTOMATED ("MYZR") mode as discussed below in connection with FIG. 29. If no change in mode is detected or requested, control passes back to task 376 where sequential processing continues and control remains in a processing loop of tasks 376, 378, 380 and 382. When a change in mode is detected or selected, control passes to connector task 366 where control passes to the control processing for that selected mode.

Figure 25:
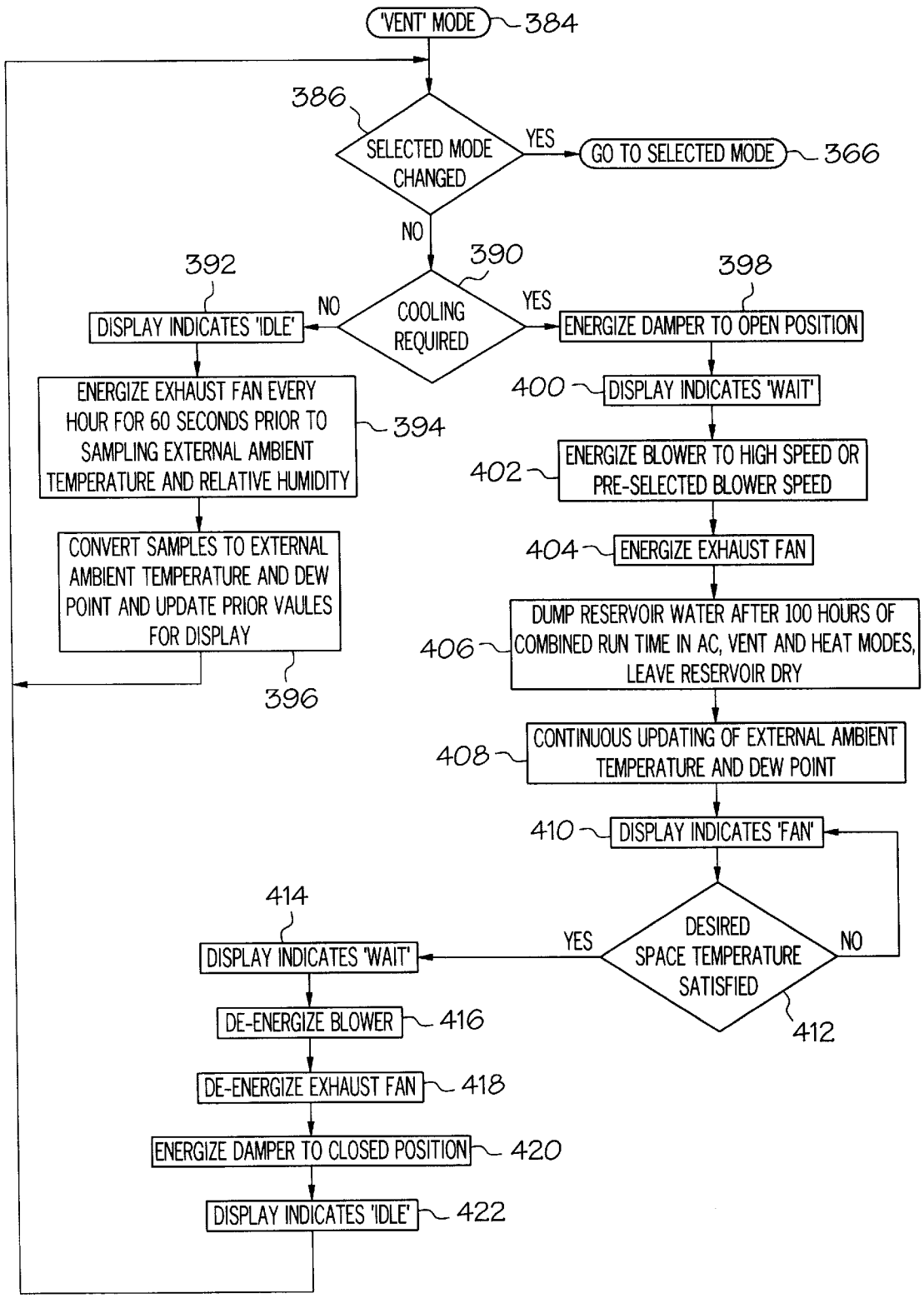
FIG. 25 shows a flowchart of a controller process for "VENT" mode selected operation of a preferred embodiment of the present invention.

FIG. 25 shows a flowchart of a "VENT" mode process 384 used by an exemplary programmable controller for "VENT" mode operation of an exemplary heating and cooling unit in accordance with a preferred embodiment of the present invention. The "VENT" control process begins at a decision task 386 that checks for a change in the selected mode. If the selected mode has changed, for example by user-supplied input from the display panel, control passes to the control processing for that selected mode, as indicated by connector task 366. If no change in mode is detected, control goes to a decision task 390 to check if cooling of the enclosed space is required as determined from a thermostat located inside the enclosed space. That is, when the thermostat inside the enclosed space determines that sensed space temperature or internal temperature is above a user-supplied desired temperature, cooling is required. When the thermostat determines that the internal temperature is at or below the user-supplied desired temperature, no cooling is needed. For one embodiment, the thermostat is located proximate display panel 184 (FIG. 20) and sends a signal to the controller that requests cooling as required.

When no cooling is requested or required, control passes from decision task 390 to a task 392 that sets the display to indicate "IDLE". After task 392 control passes to a task 394 that energizes the exhaust fan at one hour intervals for 60 seconds prior to sampling the temperature sensor and the relative humidity sensor. During sampling of the external temperature sensor and the relative humidity sensor, the controller converts the sensor signals into ambient dry bulb temperature and ambient dew point respectively, in a task 396. After task 396 control passes to decision task 386 to check for any change in the selected mode. If the controller detects a selected mode change, control passes to a connector task 366 which passes control to the beginning of control processing for the appropriate mode. When the selected mode is unchanged, control passes to decision task 390 to determine if the enclosed space requires cooling. If cooling is not required control passes to task 392 and processing continues as shown, looping through tasks 394, 396, 386, 390, and 392 until the selected mode changes or cooling is required.

When cooling is required, the controller energizes the damper to the open position or first configuration in a task 398. After task 398, the display is set to indicate "WAIT" in a task 400. After task 400, the controller energizes the blower to high speed or to a user-supplied, pre-selected low speed in a task 402. For the embodiment shown in FIGS. 24–29, the blower is a two speed blower that has a high speed and low speed. The blower speed defaults to high speed when in the "VENT" and "EVAP" modes and defaults to low speed when in the "HEAT" and "AC" modes. In the "VENT" and "EVAP" modes however, the blower speed can be pre-selected to low speed by user-supplied input from the display panel.

After task 402 the controller energizes the exhaust fan in a task 404, which for one embodiment is a two speed fan having default fan speeds that can be changed by user-supplied input through the display panel. After task 404 the controller determines a combined run time in "AC", "VENT", and "HEAT" modes, and dumps cooling water out of the reservoir when the combined run time exceeds 100 hours, in a task 406. This prevents water in the reservoir from stagnating and corroding cooling unit components and/or fasteners. Typically, task 406 occurs when seasons change such as fall to winter or when distinct changes in climate occur such as the start of a monsoon season. After task 406, the ambient temperature and ambient dew point are continuously updated in a task 408 and a task 410 sets the display to indicate "FAN". Continuous updating of the sensors occurs when the damper is in the open position and updating of the sensors occurs less frequently when the damper is in the closed position. After task 410, a decision task 412 checks to see if the desired temperature of the enclosed space is satisfied. That is, when the space temperature is the same as or lower than the desired space temperature, the space temperature is considered to be satisfied. When the desired space temperature is not satisfied, the display continues to indicate "FAN" from task 410 and the controller continues to check to see if the desired space temperature is satisfied in task 412.

When the desired space temperature is satisfied, the controller sets the display to indicate "WAIT" in a task 414. After which, the controller de-energizes the blower in a task 416 and de-energizes the exhaust fan in a following task 418. After task 418, the controller energizes the damper to the closed position or first configuration in a task 420. Setting the damper in the closed position helps to protect the evaporator of the air-conditioning apparatus from possible exposure to dirt and debris from unfiltered external air. After task 420, the controller changes the display to indicate "IDLE" in a task 422. From task 422, control passes to decision task 386 and processing continues as discussed above.

Figure 26:
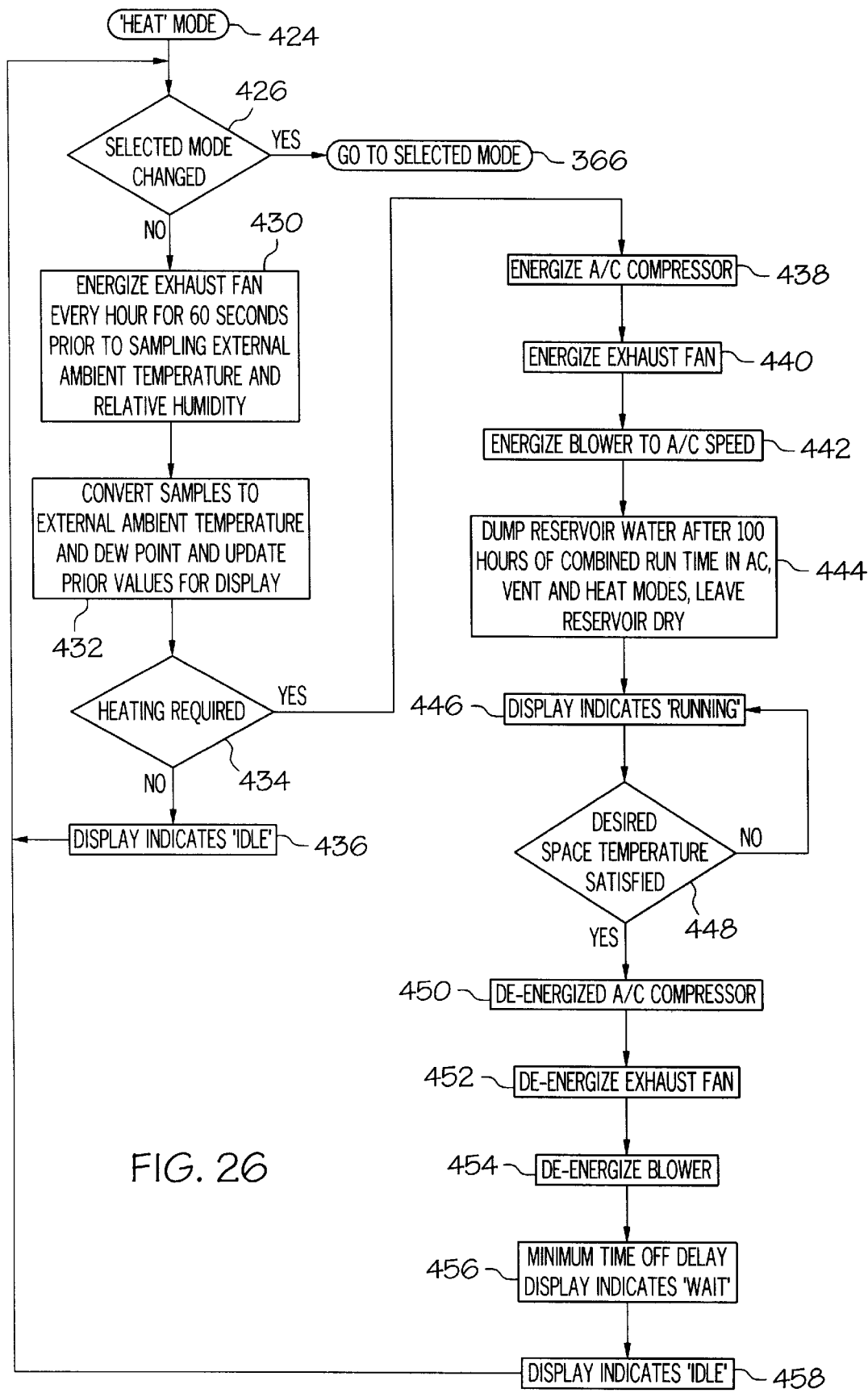
FIG. 26 shows a flowchart of a controller process for "HEAT" mode selected operation of a preferred embodiment of the present invention.

FIG. 26 shows a flowchart of a "HEAT" mode process 424 used by an exemplary programmable controller for "HEAT" mode operation of an exemplary heating and cooling unit in accordance with a preferred embodiment of the present invention. "HEAT" control process 424 and begins with a decision task 426 that checks for a change in the selected mode. If the selected mode has changed, control passes to the control processing for that selected mode, as indicated by connector task 366. If no change in the selected mode is detected, control goes to a task 430 that energizes the exhaust fan at one hour intervals for 60 seconds, prior to sampling the ambient temperature and relative humidity. After which, in a task 432 the controller converts the sensed ambient temperature and the sensed relative humidity into the ambient dry bulb temperature and the ambient dew point in a manner as previously discussed. Following task 432, for one embodiment, a decision task 434 uses input from a thermostat located inside the enclosed space to determine if heating is required. That is, when the sensed space temperature is below a user-supplied desired temperature, the thermostat transmits a signal to the controller indicating that heating is required, and when the space temperature is at or above the user-supplied desired temperature, the thermostat sends a signal indicating that no heating is needed. If heating is not required the controller sets the display to indicate "IDLE" in a task 436. After task 436 control passes to decision task 426 and processing continues as shown, looping through tasks 430, 432, 434, 436, and 426 until the selected mode changes or heating is required.

When heating is required the controller energizes the air-conditioning compressor in a task 438. After task 438 the controller energizes the exhaust fan in a task 440. Following task 440, the controller energizes the blower to air-conditioning or low speed in a task 442. After task 442 the controller determines a combined run time in "AC", "VENT", and "HEAT" modes, and dumps cooling water out of the reservoir when the combined run time exceeds 100 hours, in a task 444. After task 444, the controller sets the display to indicate "RUNNING" in a task 446. Following task 446, the controller checks to see if the desired space temperature is satisfied in a decision task 448. When the desired space temperature is not satisfied, the display continues to indicate "RUNNING" from task 446 and the controller continues to check to see if the desired space temperature is satisfied in task 448.

When the desired space temperature is satisfied, the controller de-energizes the air-conditioning compressor in a task 450 and de-energizes the exhaust fan in a following task 452. After task 452, the controller de-energizes the blower in a task 454. After task 454, the controller starts a minimum time off delay and sets the display to indicate "WAIT" in a task 456. This minimum time off delay allows various pressures differences inside the heat pumping apparatus to equalize, which helps prevent the compressor from working against residual high pressures differences during startup. For one preferred embodiment of the present invention, the minimum time off delay is five minutes. After the time off delay, the controller changes the display to "IDLE" in a task 458. From task 458, control passes to decision task 426 and processing continues as discussed above.

Figure 27:
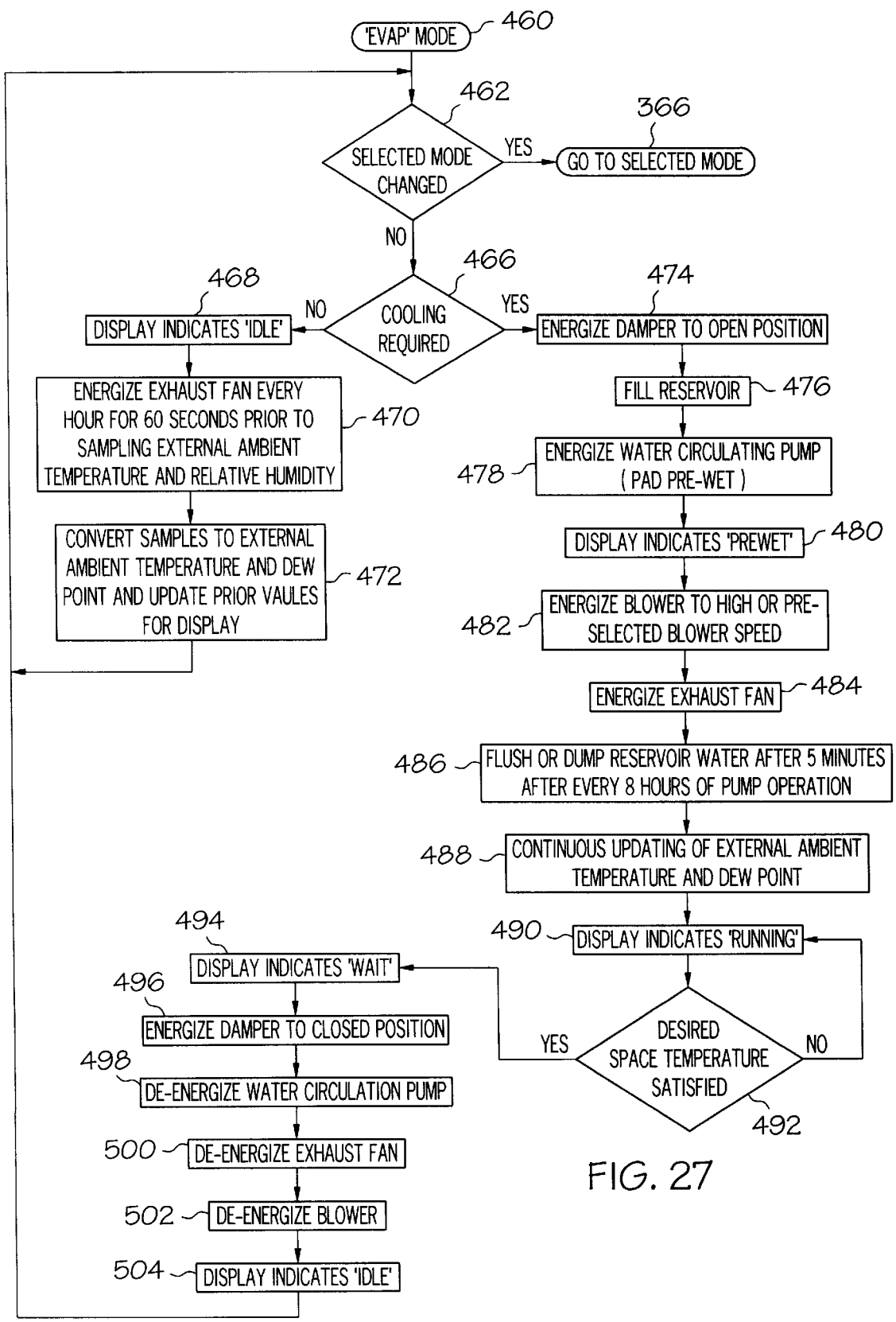
FIG. 27 shows a flowchart of a controller process for "EVAP" mode selected operation of a preferred embodiment of the present invention.

FIG. 27 shows a flowchart of an "EVAP" mode process 460 used by an exemplary programmable controller for "EVAP" mode operation of an exemplary heating and cooling unit in accordance with a preferred embodiment of the present invention. "EVAP" control process 460 begins at a decision task 462 that checks for a change in the selected mode. If the selected mode has changed, control passes to the control processing for that selected mode, as indicated by connector task 366. If no change in the selected mode is detected, control goes to a decision task 466 that checks input from the thermostat as previously discussed and determines if cooling is required.

When no cooling is required control passes from decision task 466 to a task 468 that sets the display to indicate "IDLE". After task 468 control passes to a task 470 that energizes the exhaust fan at one hour intervals for 60 seconds prior to sampling the temperature sensor and the relative humidity sensor. After which, in a task 472 the controller updates the ambient dry bulb temperature and the ambient dew point in a manner as previously discussed. After task 472 control passes to decision task 462 and processing continues as shown, looping through tasks 466, 468, 470, 472, and 462 until the selected mode changes or cooling is required.

When cooling is required, the controller energizes the damper to the open position or first configuration in a task 474. Following task 474, the controller checks the reservoir and determines if the reservoir needs to be filled in a task 476. For one embodiment, when the reservoir needs to be filled the controller opens reservoir inlet valve 344 (FIG. 23) until the reservoir is filled with the appropriate amount of cooling water and then closes the valve if necessary. After which the controller energizes the water circulating pump or pump to "prewet" the cooling pad in a task 478. After starting task 478 the controller sets the display to indicate "prewet" in a task 480. After task 480, the controller energizes the blower to high speed or to the user-supplied pre-selected low speed in a like manner as previously discussed in "VENT" mode operation, in a task 482. Following task 482 the controller energizes the exhaust fan in a task 484. In one embodiment of the present invention, the controller periodically flushes a portion of cooling water out of the reservoir through the dump valve. After task 484, the controller flushes or dumps cooling water from the reservoir for five minutes when pump operation exceeds eight hours, in a task 486. After task 486, the ambient temperature and ambient dew point are continuously converted to external ambient dry bulb temperature and external ambient dew point, in a task 488 and a task 490 sets the display to indicate "RUNNING". After task 490, a decision task 492 checks to see if the desired temperature of the enclosed space is satisfied. When the desired space temperature is not satisfied, the display continues to indicate "RUNNING" from task 490 and the controller continues to check to see if the desired space temperature is satisfied in task 492.

When the space temperature is satisfied, the controller sets the display to indicate "WAIT" in a task 494, after which the controller energizes the damper to the closed position or second configuration in a task 496. After task 496, the controller de-energizes the pump in a task 498. Following task 498, the controller de-energizes the exhaust fan in a task 500. After de-energizing the exhaust fan the controller de-energizes the blower in a task 502 and sets the display to indicate "IDLE" in a following task 504. From task 504, control passes to decision task 462 and processing continues as discussed above.

Figure 28:
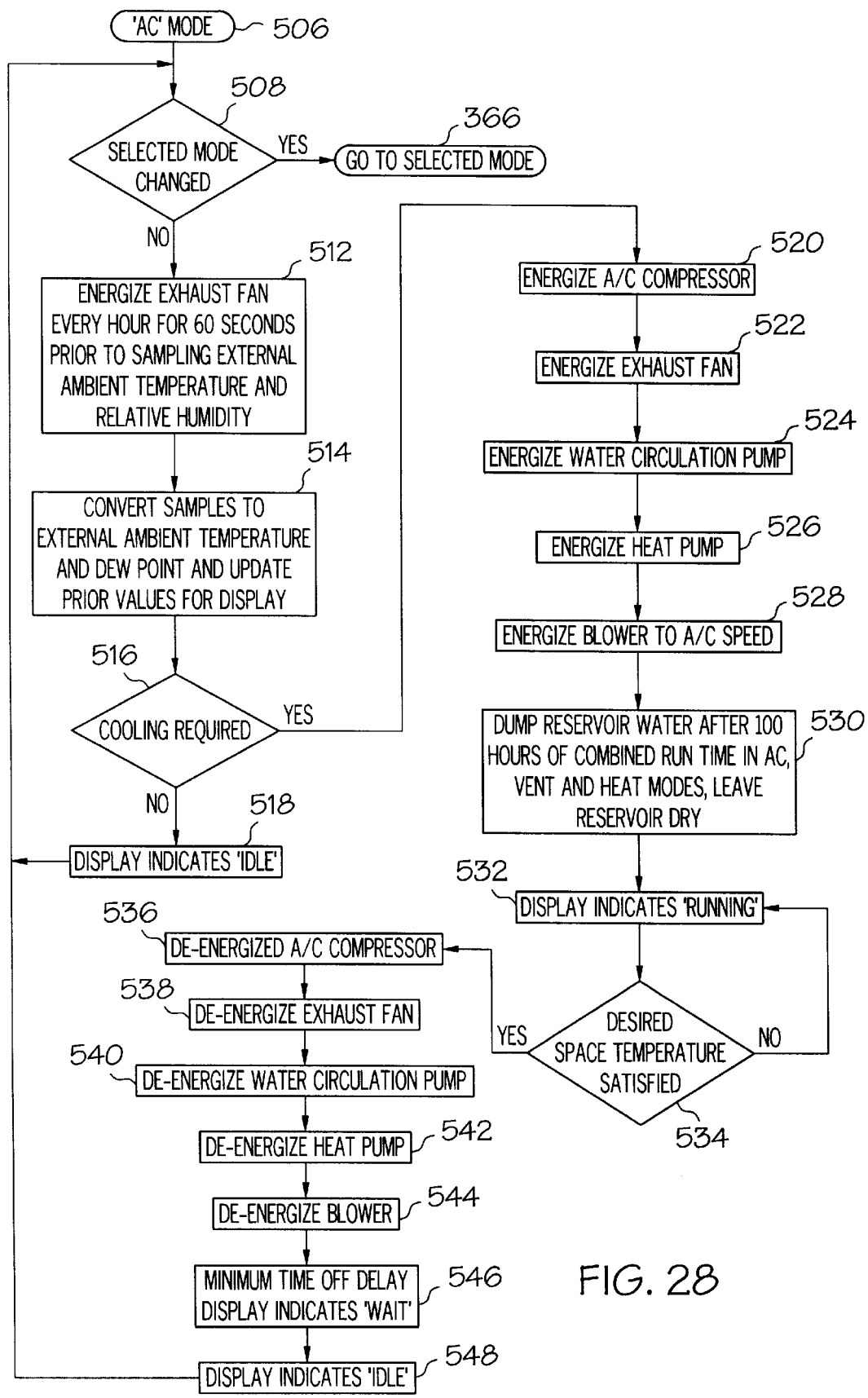
FIG. 28 shows a flowchart of a controller process for "AC" mode selected operation of a preferred embodiment of the present invention.

FIG. 28 shows a flowchart of an "AC" mode process 506 used by an exemplary programmable controller for "AC" mode operation of an exemplary heating and cooling unit in accordance with a preferred embodiment of the present invention. "AC" control process 506 begins at a decision task 508 that checks for a change in the selected mode. If the selected mode has changed, control passes to the control processing for that selected mode, as indicated by connector task 366. If no change in the selected mode is detected, control goes to a task 512 that energizes the exhaust fan at one hour intervals for 60 seconds, prior to sampling the ambient temperature and relative humidity. After task 512, in a task 514 the controller updates the ambient dry bulb temperature and the ambient dew point in a manner as previously discussed. Following task 514, a decision task 516 checks input from the thermostat to see if cooling is required. That is, when the thermostat determines that the sensed space temperature is above the user-supplied desired temperature, cooling is required and when the space temperature is at or below the user-supplied desired temperature, no cooling is needed. If cooling is not required the controller sets the display to indicate "IDLE" in a task 518. After task 518 control passes to decision task 508 and processing continues as shown, looping through tasks 512, 514, 516, 518, and 508 until the selected mode changes or cooling is required.

When cooling is required the controller energizes the air-conditioning compressor in a task 520 and the exhaust fan in a following task 522. After task 522, the controller energizes the circulating pump in a task 524. In this embodiment the exhaust fan acts as a cooling fan for the condenser, moving external ambient air through the wet cooling pad, exiting the evaporatively cooled air through the condenser coils and exhaust port, to the external environment (see FIG. 21).

Following task 524 the controller energizes the heat pump in a task 526. Those skilled in the art realize that a conventional heat pump has a reversing valve that reverses the flow direction of the refrigerant in the heat pumping system such that when the reversing valve is in a first position the heat pumping system supplies cooled air to the enclosed space and when the reversing valve is in a second position the heat pumping system supplies heated air to the enclosed space. For this embodiment the heat pump is configured to supply cooled air when the heat pump reversing valve is energized and heated air when it is de-energized. After energizing the heat pump to supply cooled air to the enclosed space in task 526, the blower is energized to air-conditioning or low speed in a task 528.

After task 528 the controller determines a combined run time in "AC", "VENT", and "HEAT" modes, and dumps cooling water out of the reservoir when the combined run time exceeds 100 hours, in a task 530. After task 530, the controller sets the display to indicate "RUNNING" in a task 532. Following task 532, the controller checks to see if the desired space temperature is satisfied in a decision task 534. When the desired space temperature is not satisfied, the display continues to indicate "RUNNING" from task 532 and the controller continues to check to see if the desired space temperature is satisfied in task 534.

When the desired space temperature is satisfied, the controller de-energizes the air-conditioning compressor in a task 536 and de-energizes the exhaust fan in a following task 538. After task 538, the controller de-energizes the pump in a task 540. Following task 540 the controller de-energizes the heat pump, configuring the heat pumping system to be in a heating configuration in a task 542. After de-energizing the heat pump reversing valve, the controller de-energizes the blower in a task 544. Following task 544, the controller starts a minimum time off delay and sets the display to indicate "WAIT" in a task 546. This conventional minimum time off delay allows various pressures differences inside the heat pumping apparatus to equalize, which helps prevent the compressor from working against residual high pressures differences during startup. For one preferred embodiment of the present invention the minimum time off delay is five minutes. After the time off delay, the controller changes the display to "IDLE" in a task 548. From task 548, control passes to decision task 508 and processing continues as discussed above.

Figure 29:
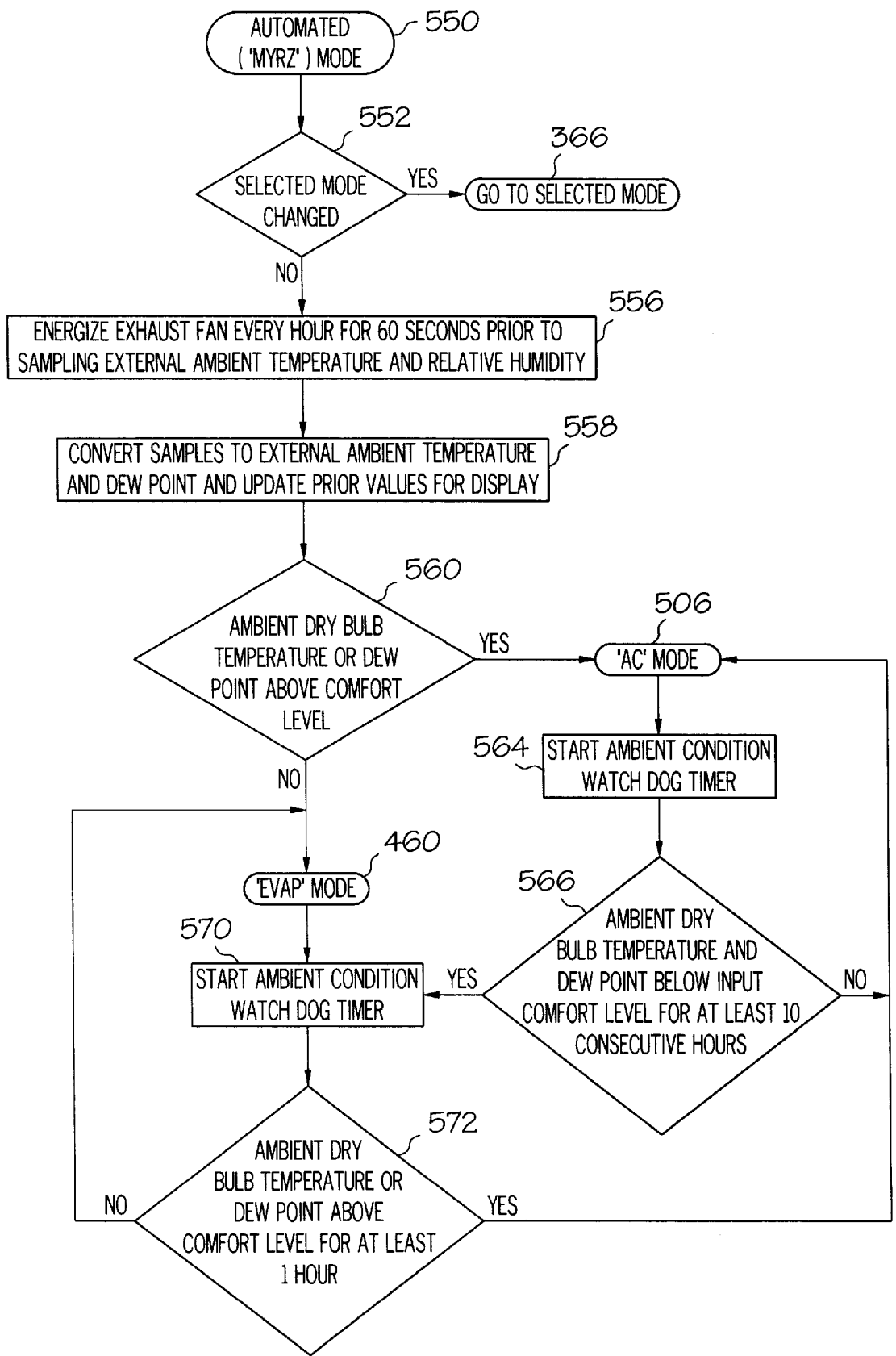
FIG. 29 shows a flowchart of a controller process for AUTOMATED ("MYZR") mode selected operation of a preferred embodiment of the present invention.

FIG. 29 shows a flowchart of an AUTOMATED "(MYZER)" process 550 used by an exemplary programmable controller for AUTOMATED ("MYZR") mode operation of an exemplary heating and cooling unit in accordance with a preferred embodiment of the present invention. AUTOMATED control process 550 begins at a decision task 552 that checks for a change in the selected mode. If the selected mode has changed, control passes to the control processing for that selected mode, as indicated by connector task 366. If no change in the selected mode is detected, control goes to a task 556 that energizes the exhaust fan at one hour intervals for 60 seconds, prior to sampling the ambient temperature and relative humidity. After which, in a task 558 the controller converts the ambient temperature and relative humidity into the external ambient dry bulb temperature and the external ambient dew point in a manner as previously discussed.

In a decision task 560, the controller compares the updated dry bulb temperature and the updated dew point to the user-supplied desired comfort level. The controller receives the user-supplied comfort level from the display panel. The comfort level represents two parameters that characterize the external ambient temperature and humidity. These two parameters are used to determine a change point at which the unit will switch between air-conditioning operation and evaporative cooling operation. The switching between air-conditioning and evaporative cooling is accomplished in part by the positioning of the damper in either a closed or open position as previously described. For one embodiment, the comfort level uses the external ambient dry bulb temperature and external ambient dew point as the two parameters. Those skilled in the art will realize that any of a variety of combinations of other parameters that characterize ambient temperature and humidity could also be used. For example, ambient dry bulb and wet bulb temperature could be used to characterize or define the comfort level. Moreover, with a programmable controller the comfort level can be any one of a plurality of user-selectable comfort levels. In one embodiment of the present invention, any one of five comfort levels may be selected, each having a predetermined dew point and a predetermined dry bulb temperature. For example, in one embodiment a Comfort Level 1=dew point of 44 degrees F. / dry bulb temperature of 108 degrees F., a Comfort Level 2=dew point of 46 degrees F. / dry bulb temperature of 110 degrees F., a Comfort Level 3=dew point of 48 degrees F. / dry bulb temperature of 111 degrees F., a Comfort Level 4=dew point of 50 degrees F. / dry bulb temperature of 112 degrees F., and a Comfort Level 5=dew point of 52 degrees F. / dry bulb temperature of 113 degrees F.

For the embodiment shown in FIG. 29, when the controller determines that the external conditions exceed the ambient dry bulb temperature or the ambient dew point for the currently selected comfort level, the "AC" mode will be automatically selected as an initial configuration and the controller begins "AC" mode processing as indicated by process 506. The controller executes process 506 in a background mode, exiting from tome to time, in a manner known to those skilled in the art, to perform tasks in process 550. During "AC" mode, the heating and cooling unit exploits or uses the air-conditioning apparatus to provide air-conditioned air to the enclosed space. After the controller starts control processing in the "AC" mode (see FIG. 28) the controller starts a watch dog timer in a task 564. The watch dog timer tracks external ambient conditions over a period of time. For the embodiment shown, the watch dog timer in the "AC" mode retains a running history of desirably at least ten hours and preferably around twenty hours of past ambient dry bulb temperatures and their corresponding ambient dew points. In a decision task 566, the controller uses the watch dog timer history to determine whether to stay in "AC" mode or switch to "EVAP" mode. The controller continues processing in the "AC" mode until another mode is selected or until the ambient dry bulb temperature and the ambient dew point remain below the user-supplied comfort level for a period of time specified in the watch dog timer. This time delay prevents the heating and cooling unit from switching from "AC" to "EVAP" mode the instant the ambient conditions fall below the selected comfort level.

When the ambient dry bulb temperature and the ambient dew point remain below the user supplied comfort level for at least ten consecutive hours, and preferably twenty consecutive hours, the controller evaluates the initially selected configuration and subsequently selects the damper first configuration or open position. Decision task 566 switches to and begins "EVAP" mode processing as indicated by process 460. The controller executes process 460 in a background mode, exiting from time to time, in a manner known to those skilled in the art, to perform tasks in process 550. "EVAP" mode processing 460 will also start in the background mode as described above, when the ambient dry bulb temperature and the ambient dew point are below the user-supplied comfort level and the "EVAP" mode is the initial configuration as determined in decision task 560.

After the controller starts control processing in the "EVAP" mode (see FIG. 27) the controller starts a watch dog timer in a task 570. During "EVAP" mode, the heating and cooling unit exploits or uses the evaporative cooling apparatus to provide cooled air to the enclosed space. For the embodiment shown, the watch dog timer in the "EVAP" mode retains a running history over at least the past hour and preferably over the past three hours, of ambient dry bulb temperatures and their corresponding ambient dew points. In a decision task 572, the controller uses the watch dog timer history to determine whether to stay in "EVAP" mode or switch to "AC" mode. For the embodiment shown, the controller remains in the "EVAP" mode until another mode is selected or until one of the ambient dry bulb temperature or the ambient dew point, remains above the user-supplied comfort level for the time period specified in the watch dog timer. In this embodiment, a one hour and preferably a three hour trend in ambient conditions is used to help ensure that the heating and cooling unit supplies adequately cooled air to the enclosed space. When the ambient dry bulb temperature or the ambient dew point remains above the user supplied comfort level for a time period greater than specified in the watch dog timer, the controller evaluates the initially selected configuration and subsequently selects the damper second configuration or closed position. Decision task 572 switches to and begins "AC" mode process 506 in the background mode as described above. After the controller starts control processing in the "AC" mode the controller starts the watch dog timer in task 564 and continues processing as indicated.

Figure 30:
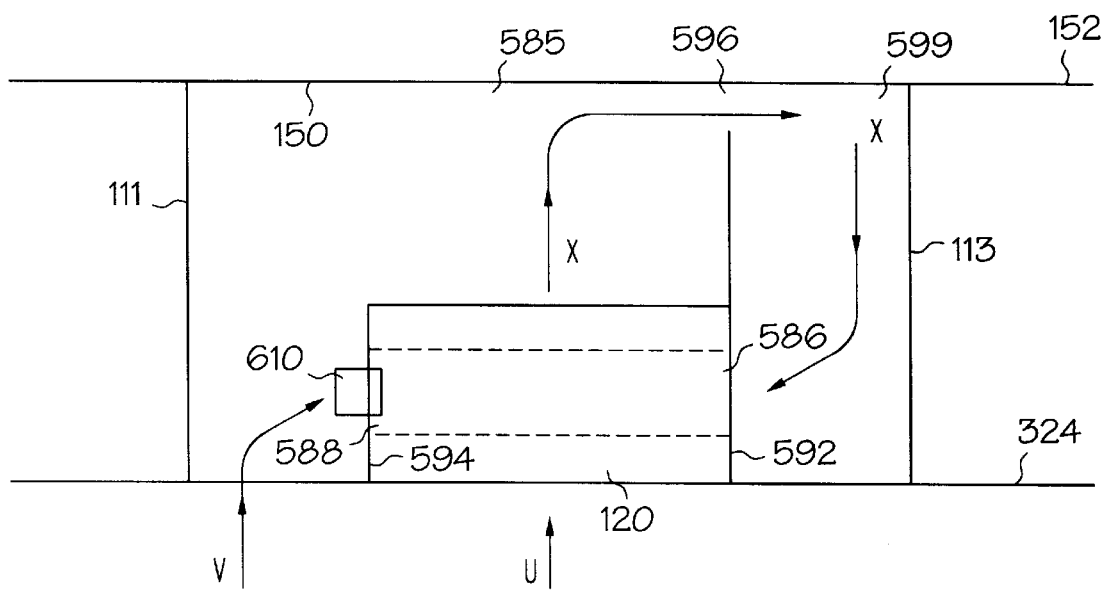
FIG. 30 shows a schematic view of blower inlet airflow when the damper is in the closed position or second configuration.

FIG. 30 shows a schematic view of inlet airflow to blower 120 when damper 130 is in the closed position or second configuration. Although damper 130 is not shown, damper 130 has a closed position that is indicated by the solid line position of damper 130 in FIG. 21. Blower 120 is located with its bottom section substantially level with and proximate to top section 324. Although not specifically shown in FIG. 30, blower 120 has a blower inlet opening 586 and a blower inlet opening 588. For the embodiment shown, blower 120 has two mounting brackets that are attached to top section 324. One mounting bracket is configured to be a baffle 592 that is attached to blower 120 at inlet opening 586. In this embodiment, baffle 592 is substantially a flat plate having an opening proximate inlet opening 586 that is larger than opening 586. A second mounting bracket 594 is attached to blower 120 at inlet opening 588. Mounting bracket 594 has an opening proximate inlet opening 588 that is larger than opening 588.

FIG. 30 shows partitions 113 and 111 extending from top section 324 to lower surface 150 (see FIG. 7 also) of upper panel section 152. For the embodiment shown, partitions 113 and 111 are each configured to join top section 324 and lower surface 150 in a manner that substantially forms a seal at the joining thereof. Moreover, partition 113, partition 111, and baffle 592 each have a back edge that joins a back partition 585 to substantially form a seal at the joining thereof. This creates a baffle inlet channel 599 that accesses blower inlet opening 586.

Figure 31:
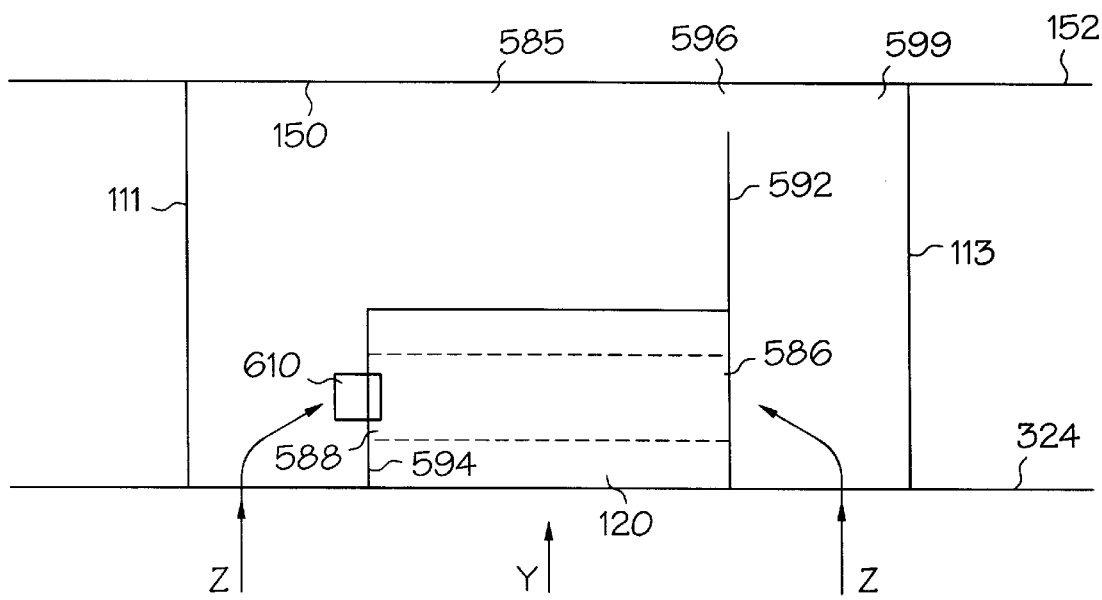
FIG. 31 shows a schematic view of blower inlet airflow when the damper is in the open position or first configuration.
Figure 32:
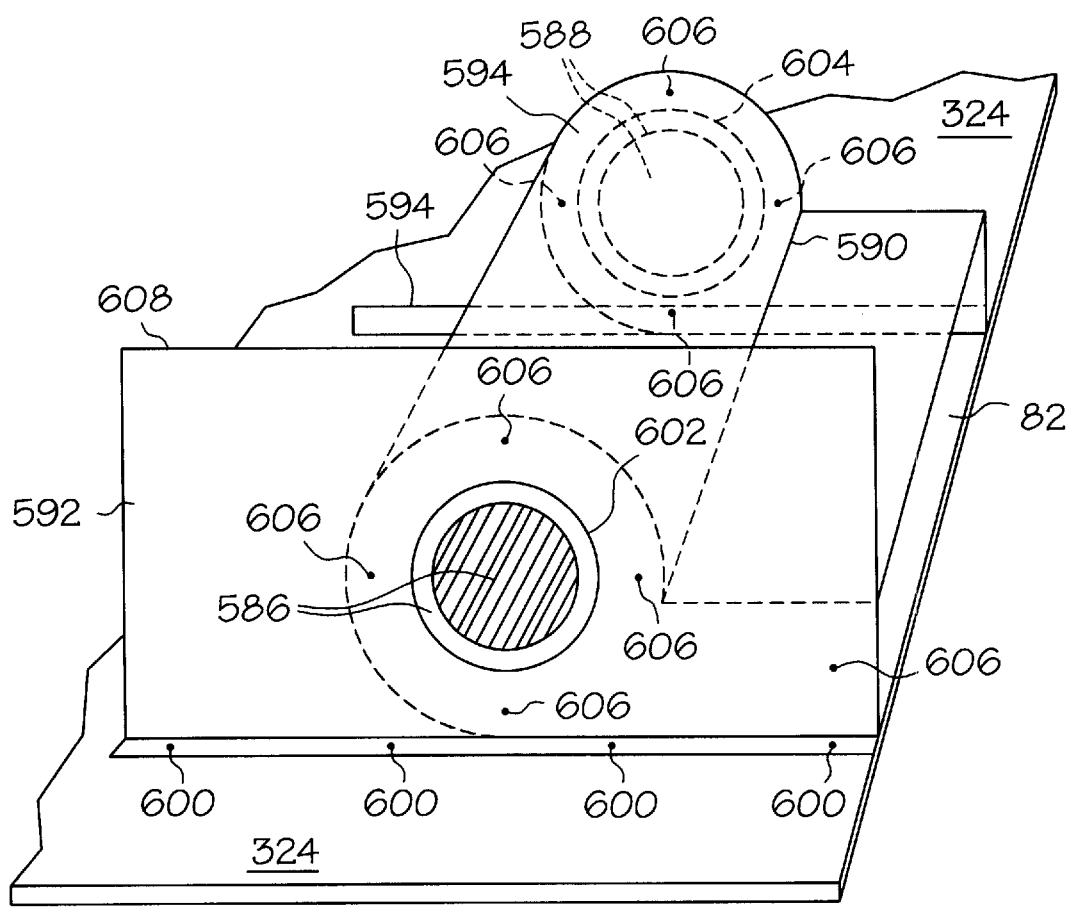
FIG. 32 shows a side view of a blower and blower mounting bracket configuration in accordance with a preferred embodiment of the present invention.

For the embodiments shown in FIGS. 30–32, blower 120 is configured to be a squirrel cage blower coupled to a drive motor 610 (FIGS. 21, 30 and 31). The coupling of drive motor 610 to the squirrel cage blower can be accomplished by a variety of means. One such means known to those skilled in the art, locates the drive motor proximate one of the inlet openings of the blower such that a drive shaft of the drive motor and an axial support shaft of the squirrel cage blower can be coupled together using a conventional system of pulleys and belts. Another such means known to those skilled in the art, locates the drive motor proximate one of the inlet openings of the blower such that the drive shaft of the drive motor can be directly connected or coupled to the axial support shaft of the squirrel cage blower. Another means known to those skilled in the art, uses a system of gears to connect the drive shaft of the drive motor to the axial support shaft of the squirrel cage blower.

To help reduce airflow restrictions when operating the evaporative cooling apparatus, one preferred location of the drive motor is at the inlet opening furthest from the cooling pad. This preferred location applies to any of the variety of coupling means discussed above. Locating drive motor 610 at inlet opening 588, leaves inlet opening 586, substantially unrestricted and helps provide a desirable high airflow for evaporative cooling operation (see FIGS. 21, 30 and 31). FIGS. 30 and 31 show drive motor 610 as being directly coupled to the squirrel cage blower and show a portion of drive motor 610 being located inside inlet opening 588.

As shown in FIG. 30, baffle 592 does not extend up to or join with lower surface 150, as partitions 113 and 111 do. This creates a baffle gap 596 between a top edge of baffle 592 and lower surface 150. Baffle gap 596 is sized as a result of baffle 592's dimensions. A variety of desirable sizes of baffle gap 596 can be achieved using an appropriately dimensioned baffle 592 to provide the desired baffle gap.

Referring back to FIG. 21, a corresponding top view is shown of blower 120, partition 113, partition 111, mounting bracket 594, baffle 592, and drive motor 610. As shown in FIG. 21, a front edge of partition 113 substantially seals with a back edge of damper 130 when damper 130 is in the closed position (solid line). Moreover, a front edge of baffle 592 abuts with damper 130 and substantially seals with damper 130 when damper 130 is in the closed position (solid line). FIG. 21 also shows that a front edge of partition 111 substantially seals with the back edge of damper 130 when damper 130 is in the open position (dashed line).

FIG. 30 also shows arrows U, V, and X that indicate airflow direction into blower inlet openings 586 and 588 when blower 120 is operating and damper 130 (FIG. 21) is in the closed position as occurs during "AC" or "HEAT" mode operation. Airflow exiting the evaporator 304 moves in a direction as indicated by arrow U, in FIG. 30. A small portion of that airflow moves in a direction as indicated by arrow V and enters blower 120 around drive motor 610 through bracket 594 and blower inlet opening 588. A remaining portion of that airflow moves in a direction as indicated by the X arrows, moving through baffle gap 596 at the top of baffle 592 to blower inlet opening 586.

FIG. 31 shows a schematic view of inlet airflow to blower 120 when damper 130 is in the open position or first configuration. Although damper 130 is not shown in FIG. 31, damper 130 has an open position that is indicated by the dashed line in FIG. 21. Since the damper position is not shown in FIGS. 30 and 31, FIGS. 30 and 31 are identical except that FIG. 31 has arrows Y and Z while FIG. 30 has arrows U, V, and X. FIG. 31 shows airflow exiting the cooling pad 300 (FIG. 21) as moving in a direction indicated by arrow y. Each arrow Z in FIG. 31 indicates the direction of blower inlet airflow into one of blower inlet openings 586 and 588. A portion of airflow exiting the cooler pad moves around drive motor 610 to enter blower 120 through blower inlet opening 588 as shown. A remaining portion of that airflow enters blower 120 through blower inlet opening 586 as shown.

As previously discussed in the background, evaporative cooling units desirably operate at relatively high airflow, while air-conditioning units desirably operate at relatively low airflow. For the embodiment shown in FIG. 30, baffle 592 in conjunction with damper 130 and obstruction provided by drive motor 610 (FIG. 21) tend to promote high operating airflow when damper 130 is in the open position and low operating airflow when damper 130 is in the closed position. This is accomplished by providing substantially unrestricted airflow to blower inlet opening 586 (FIGS. 30 and 31) when damper 130 (FIG. 21) is in the open position (see FIG. 31) and providing restricted airflow to inlet opening 586 when the damper is in the closed position (see FIG. 30).

For example, in one embodiment a single speed drive motor is coupled to blower 120. When unit 40 exploits refrigeration or air-conditioning apparatus 116, damper 130 is disposed in the closed position, as indicated by the solid line damper position shown in FIG. 21, and unit 40 functions as an air-conditioning system. In this embodiment, blower 120 operates at that single speed and the total airflow provided by blower 120 is substantially determined by the total airflow going through blower inlet openings 586 and 588 (see FIG. 30). Blower 120 moves return air from the inlet port through the evaporator. After exiting the evaporator, airflow can go around drive motor 610 and through inlet opening 588, as indicated by arrow V, but is limited by obstruction of drive motor 610 (FIG. 30). Airflow can also go over the top of baffle 592, through baffle gap 596 and through inlet opening 586 as indicated by the X arrows. Those skilled in the art will realize the total airflow provided by blower 120 can be easily matched to the desired operating airflow of the air-conditioning apparatus by reducing or increasing the size of baffle gap 596, by appropriately changing the dimensions of baffle 592.

For the same example, when unit 40 exploits evaporative cooling apparatus 118, damper 130 is disposed in the open position (dashed line damper position) such that unit 40 functions as an evaporative cooling system (FIG. 21). For this embodiment, blower 120 operates at the single speed and the total airflow provided by blower 120 is substantially determined by the total airflow going through inlet openings 586 and 588 (FIG. 31). Blower 120 moves external ambient air through the cooling pad. After exiting the cooling pad, as indicated by arrow Y, evaporatively cooled air can go around drive motor 610 and through inlet opening 588 as indicated by an arrow Z. The cooled air can also go through a baffle inlet channel 599 and through inlet opening 586 as indicated by an arrow Z. Those skilled in the art will realize that when inlet openings 586 and 588 are unblocked or unrestricted, a maximum total airflow through inlet openings 586 and 588 is substantially determined by the size and operating speed of blower 120. Accordingly, in this example, an appropriately sized blower with a drive motor having an appropriate single operating speed would be selected to match the desired operating airflow for a selected evaporative cooling system and baffle 592 would be dimensioned to provide the desired reduced operating airflow for a selected air-conditioning system.

FIG. 32 shows a perspective view of blower 120 with baffle 592, and mounting bracket 594 coupled to top section 324 in accordance with a preferred embodiment of the present invention. For this embodiment, baffle 592 is configured to be a blower mounting bracket that is attach to top section 324 by a quantity of mounting bracket fasteners 600 and mounting bracket 594 is attached to top section 324 in a like manner. Blower 120 is shown having blower inlet opening 586 at one end and blower inlet opening 588 at its opposite end. Baffle 592 is shown having a baffle inlet opening 602 that is dimensioned larger than blower inlet opening 586 such that opening 602 provides substantially unrestricted airflow to inlet opening 586. In this embodiment, mounting bracket 594 has a mounting bracket inlet opening 604 that is dimensioned larger than blower inlet opening 588 to provide substantially unrestricted airflow to inlet opening 588. Baffle 592 is attached to blower 120 at blower inlet opening 586 by a quantity of blower fasteners 606. In a like manner, mounting bracket 594 is attached to blower 120 at blower inlet opening 588 by a second quantity of blower fasteners 606.

FIG. 32 also shows blower 120 as having an exhaust opening 590 that joins with outlet port 82 for delivering the blower total airflow to the enclosed space. For several preferred embodiments of the present invention, blower inlet opening 588 is closer to evaporator 304 (FIGS. 21 and 23) than blower inlet opening 586. For these and other embodiments, blower inlet opening 588 (FIGS. 30 and 31) is a preferred location for the drive motor and/or its mechanism for coupling to blower 120, such as the belt and pulley system previously discussed. Locating the drive motor and/ or its coupling mechanism in such a manner, tends to desirably restrict airflow into inlet opening 588 when damper 130 is in the closed position. Moreover, this location tends to provide unrestricted airflow to inlet opening 586 for the desirable high operating airflow when damper 130 is in the open position. Accordingly, baffle 592 is dimensioned such that air can flow over baffle 592, through baffle gap 596 to blower inlet opening 586 (FIG. 30) providing the desired operating airflow for the air-conditioning apparatus. Those skilled in the art will realize that dimensioning baffle 592 to provide this desired operating airflow when damper 130 is in the closed position can be accomplished by any of a variety of means or combinations thereof. Although not specifically shown, one such means drills holes in baffle 592 to provide the desired operating airflow. Another means dimensions baffle 592 to increase a spacing between baffle 592 and damper 130 when damper 130 is in the closed position.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for operating a combined refrigeration system and evaporative cooling system that maintains a structurally enclosed space proximate a desired comfort level, said refrigeration system and evaporative cooling system having a first configuration that exploits an evaporative cooling apparatus and a second configuration that exploits a refrigeration apparatus, said evaporative cooling apparatus comprising a water reservoir that holds an amount of cooling water, a cooling pad that temporarily retains a portion of said cooling water, and a pump that moves said cooling water from said reservoir to said cooling pad, said method comprising the steps of:

sensing external ambient dry bulb temperature and external ambient dew point;

determining said desired comfort level;

selecting one of said first configuration and said second configuration to be an initially selected configuration in response to said external ambient sensing step and said determining step, said selecting step being performed by a controller;

actuating a damper by said controller in response to said selecting step to configure said system to operate in said selected configuration; and activating said pump and opening a dump valve with said controller to flush a portion of said cooling water out of said reservoir through said dump valve such that said flushing occurs periodically during operation of said evaporative cooling apparatus.

2. A method as claimed in claim 1 wherein said method additionally comprises the step of:

locating said dump valve at an end of a cooling water line that moves said cooling water from said pump to said cooling pad.

3. A method as claimed in claim 1 wherein said evaporative cooling apparatus additionally comprises a water reservoir inlet valve having an outlet coupled to said reservoir for controlling a water supply to said reservoir, and said method additionally comprises the steps of:

opening said dump valve;

dumping said cooling water out of said reservoir through said dump valve when said evaporative cooling apparatus is inoperative in excess of a predetermined amount of time; and closing said inlet valve during said dumping step such that said opening and dumping steps substantially empties said reservoir of said cooling water.

4. An apparatus for selectively maintaining a structurally enclosed space proximate a desired comfort level, said apparatus comprising:

a housing having air-communication with said space and with an external environment, said housing including an external inlet that receives air from said external environment, an air outlet port in fluid communication with said enclosed space, an air inlet port that receives air from said space, and an air exhaust port from which air is expelled to said external environment;

a condenser located in said exhaust port;

an exhaust fan in said exhaust port;

a blower in said outlet port;

an evaporative cooling apparatus, positioned in said housing to use said blower to selectively cool said space;

a refrigeration apparatus coupled to said condenser, said refrigeration apparatus being positioned in said housing to use said blower to selectively cool said space;

an actuator mechanism positioned in said housing;

a damper coupled to said actuator mechanism, said actuator mechanism being operable to move said damper between a first configuration that exploits said evaporative cooling apparatus and a second configuration that exploits said refrigeration apparatus; and a controller coupled to said exhaust fan, said blower, and said actuator mechanism such that said controller selects one of said first configuration and said second configuration to be an initially selected configuration and selectively disposes said damper and energizes said exhaust fan in response to said selected configuration, wherein:

said exhaust fan moves air from said inlet port through said refrigeration apparatus, said exhaust fan, said condenser and said exhaust port to said external environment when said damper is in said first configuration; and said exhaust fan moves air from said external inlet, through said evaporative cooling apparatus, said exhaust fan, said condenser and said exhaust port to said external environment when said damper is in said second configuration.

5. An apparatus for selectively maintaining a structurally enclosed space proximate a desired comfort level, said apparatus comprising:

a housing having air-communication with said space and with an external environment, said housing including an external inlet that receives air from said external environment, an air outlet port in fluid communication with said enclosed space, an air inlet port that receives air from said space, an air exhaust port from which air is expelled to said external environment, and a sensor passage having air-communication with said external environment and said exhaust port;

a condenser located in said exhaust port;

an exhaust fan in said exhaust port;

a blower in said outlet port;

an evaporative cooling apparatus, positioned in said housing to use said blower to selectively cool said space;

a refrigeration apparatus coupled to said condenser, said refrigeration apparatus being positioned in said housing to use said blower to selectively cool said space;

an actuator mechanism positioned in said housing;

a damper coupled to said actuator mechanism, said actuator mechanism being operable to move said damper between a first configuration that exploits said evaporative cooling apparatus and a second configuration that exploits said refrigeration apparatus;

a controller coupled to said exhaust fan, said blower, and said actuator mechanism such that said controller selects one of said first configuration and said second configuration to be an initially selected configuration and selectively disposes said damper and energizes said exhaust fan in response to said selected configuration;

a temperature sensor located in said sensor passage and coupled to said controller; and a relative humidity sensor located in said sensor passage and coupled to said controller said controller being configured to energize said exhaust fan to move air from said external environment through said sensor passage to said exhaust port and convert sensor signals from said temperature sensor and said relative humidity sensor into an ambient dry bulb temperature and an ambient dew point, respectively.

6. An apparatus as claimed in claim 5 wherein said sensor passage additionally comprises:

an air filter positioned in said sensor passage such that said external air passes through said filter prior to said external air contacting said sensors.

7. An apparatus as claimed in claim 5 wherein said controller energizes said exhaust fan at predetermined intervals when said damper is in said second configuration to move air through said sensor passage; and said exhaust fan is energized for a predetermined duration prior to relying upon said sensor signals from said temperature sensor and said relative humidity sensor.

8. An apparatus as claimed in claim 7 wherein said sensor passage additionally comprises:

an air filter positioned in said sensor passage such that said external air passes through said filter prior to said external air contacting said sensors.

9. An apparatus as claimed in claim 5 wherein:

said controller is a programmable controller coupled to a display panel and receives a user supplied comfort level from said display panel, said comfort level being defined by a specified dry bulb temperature and a specified dew point; and said controller is configured to select one of said first configuration and said second configuration to be an initially selected configuration in response to said user-supplied comfort level, said ambient dry bulb temperature and said ambient dew point and to selectively dispose said damper in response to said selected configuration.

10. An apparatus as claimed in claim 9 wherein:

said programmable controller is additionally configured to evaluate said initially selected configuration such that when said ambient dry bulb temperature and said ambient dew point are below said user-supplied comfort level for a first period of time, said first configuration is subsequently selected and when one of said ambient dry bulb temperature and said ambient dew point is above said user-supplied comfort level for a second period of time, said second configuration is subsequently selected.

11. An apparatus for selectively maintaining a structurally enclosed space proximate a desired comfort level, said apparatus comprising:

a housing having air-communication with said space and with an external environment, said housing including:
an external inlet that receives air from said external environment;
an air outlet port in fluid communication with said enclosed space;
an air inlet port that receives air from said space;
an air exhaust port from which air is expelled to said external environment; and
a sensor passage having air-communication with said external environment and said exhaust port;

a temperature sensor located in said sensor passage;

a relative humidity sensor located in said sensor passage;

a blower in said outlet port;

an evaporative cooling apparatus positioned in said housing to use said blower to selectively cool said space;

a heat pumping apparatus having a condenser located in said exhaust port, said heat pumping apparatus being positioned in said housing to use said blower to selectively supply one of cooled air and heated air to said space;

an exhaust fan in said exhaust port, said fan being positioned to move air from said inlet port through said exhaust fan, said condenser and said exhaust port to said external environment;

an actuator mechanism positioned in said housing;

a damper pivotally mounted at a generally intermediate position of said damper and coupled to said actuator mechanism, said actuator mechanism being operable to move said damper between a first configuration that exploits said evaporative cooling apparatus and a second configuration that exploits said heat pumping apparatus;

a display panel located inside said space; and a programmable controller that receives a user supplied comfort level from said display panel, said comfort level being defined by a specified dry bulb temperature and a specified dew point, and programmable controller being coupled to said temperature sensor, said humidity sensor, said exhaust fan, said blower, and said actuator mechanism such that said controller is configured to energize said exhaust fan for a predetermined duration prior to converting a temperature signal from said temperature sensor into an ambient dry bulb temperature and a humidity signal from said humidity sensor into an ambient dew point and said controller being configured to select one of said first configuration and said second configuration to be an initially selected configuration in response to said user-supplied comfort level, said ambient dry bulb temperature and said ambient dew point, and said controller being further configured to selectively dispose said damper in response to said selected configuration.

12. An apparatus as claimed in claim 11 wherein:

said programmable controller is additionally configured to evaluate said initially selected configuration such that when said ambient dry bulb temperature and said ambient dew point are below said user supplied comfort level for at least ten consecutive hours, said first configuration is subsequently selected and when one of said ambient dry bulb temperature and said ambient dew point is above said user-supplied comfort level for at least one hour, said second configuration is subsequently selected.

13. An apparatus for selectively maintaining a structurally enclosed space proximate a desired comfort level, said apparatus comprising:

a housing having air-communication with said space and with an external environment, said housing including:
an external inlet that receives air from said external environment;
an air outlet port in fluid communication with said enclosed space;
an air inlet port that receives air from said space; and
an air exhaust port from which air is expelled to said external environment;

a blower in said outlet port, said blower having a first inlet opening, a second inlet opening and an exhaust opening;

a motor coupled to said blower;

an evaporative cooling apparatus, positioned in said housing to use said blower to selectively cool said space;

a refrigeration apparatus positioned in said housing to use said blower to selectively cool said space;

an actuator mechanism positioned in said housing;

a damper coupled to said actuator mechanism, said actuator mechanism being operable to move said damper between a first configuration that exploits said evaporative cooling apparatus and a second configuration that exploits said refrigeration apparatus;

a baffle attached at one of said first and second blower inlet openings, said baffle being configured to restrict airflow into said one inlet opening when said damper is in said second configuration; and a controller coupled to said motor and said actuator mechanism such that said controller selects one of said first configuration and said second configuration to be an initially selected configuration and selectively disposes said damper in response to said selected configuration.

14. An apparatus as claimed in claim 13 wherein said one inlet opening exhibits an inlet opening size, and said baffle is a substantially flat plate having an opening, said opening exhibiting an opening size that is greater than said inlet opening size.

15. An apparatus as claimed in claim 13 wherein said baffle allows substantially unrestricted airflow into said one inlet opening when said damper is in said first configuration.

16. An apparatus as claimed in claim 13 wherein said blower is fastened in said housing by a plurality of mounting brackets and said baffle is configured to be one of said mounting brackets.

17. An apparatus as claimed in claim 13 wherein said refrigeration apparatus has a desired operating airflow, and said baffle is dimensioned such that a total airflow provided by said blower approximately matches said refrigeration desired operating airflow when said damper is in said second configuration.

18. An apparatus as claimed in claim 17 wherein said evaporative cooling apparatus has a desired operating airflow that is greater than said refrigeration desired operating airflow, and said baffle is dimensioned such that said total airflow provided by said blower approximately matches said evaporative cooling desired operating airflow when said damper is in said first configuration.

19. An apparatus as claimed in claim 17 wherein said refrigeration apparatus is a selected refrigeration apparatus that is one of a plurality of refrigeration apparatuses each having a different desired operating airflow and said baffle is a selected baffle that provides a blower total airflow that approximately matches said desired airflow of said selected refrigeration apparatus and said selected baffle is one of a plurality of baffles, each being dimensioned to provide a desired blower total airflow that approximately matches said desired operating airflow of one of said plurality of refrigeration apparatuses when said damper is in said second configuration.

20. An apparatus for selectively maintaining a structurally enclosed space proximate a desired comfort level, said apparatus comprising:
    a housing having air-communication with said space and with an external environment, said housing including:
        an external inlet that receives air from said external environment;
        an air outlet port in fluid communication with said enclosed space;
        an air inlet port that receives air from said space; and
        an air exhaust port from which air is expelled to said external environment;
    a blower positioned at said outlet port of said housing, said blower having a first inlet opening, a second inlet opening and an exhaust opening;
    a motor having a plurality of operating speeds coupled to said blower,
    an evaporative cooling apparatus having a desired operating airflow, said evaporative cooling apparatus being positioned in said housing to use said blower to selectively cool said space;
    a refrigeration apparatus having a desired operating flow lower than said evaporative cooling desired operating flow, said refrigeration apparatus being positioned in said housing to use said blower to selectively cool said space;
    an actuator mechanism positioned in said housing;
    a damper coupled to said actuator mechanism, said actuator mechanism being operable to move said damper between a first configuration that exploits said evaporative cooling apparatus and a second configuration that exploits said refrigeration apparatus;
    a plurality of mounting brackets configured to couple said blower to said housing wherein one of said brackets comprises a baffle attached at one of said first and second blower inlet openings, said blower mounting bracket baffle being dimensioned such that a first total airflow provided by said blower approximately matches said refrigeration desired operating airflow when said damper is in said second configuration and a second total airflow provided by said blower approximately matches said evaporative cooling desired operating airflow when said damper is in said first configuration; and
    a controller coupled to said motor and said actuator mechanism such that said controller selects one of said first configuration and said second configuration to be an initially selected configuration and selectively disposes said damper and said motor operating speed in response to said selected configuration.

* * * * *